(12) United States Patent
Toennessen

(10) Patent No.: US 10,479,455 B2
(45) Date of Patent: Nov. 19, 2019

(54) PERFORMING GEOPHYSICAL SURVEYS USING UNMANNED TOW VESSELS

(71) Applicant: PGS Geophysical AS, Oslo (NO)

(72) Inventor: Rune Toennessen, Lommedalen (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/612,131

(22) Filed: Jun. 2, 2017

(65) Prior Publication Data

US 2018/0001977 A1 Jan. 4, 2018

Related U.S. Application Data

(60) Provisional application No. 62/356,132, filed on Jun. 29, 2016.

(51) Int. Cl.
| | | |
|---|---|---|
| *G05D 1/00* | (2006.01) | |
| *G05D 1/02* | (2006.01) | |
| *G01V 1/20* | (2006.01) | |
| *B63B 35/68* | (2006.01) | |
| *G01V 1/38* | (2006.01) | |
| *B63B 21/66* | (2006.01) | |

(52) U.S. Cl.
CPC .............. *B63B 35/68* (2013.01); *B63B 21/66* (2013.01); *G01V 1/201* (2013.01); *G01V 1/3808* (2013.01); *G05D 1/0027* (2013.01); *G05D 1/0088* (2013.01); *G05D 1/0206* (2013.01); *B63B 2722/00* (2013.01); *G01V 2001/207* (2013.01)

(58) Field of Classification Search
CPC ..... B63B 35/68; B63B 2722/00; B63B 21/66; G01V 1/201; G01V 1/3808; G01V 2001/207; G05D 1/0027; G05D 1/0088; G05D 1/0206

USPC .......................................................... 367/15
See application file for complete search history.

(56) References Cited

U.S. PATENT DOCUMENTS

| | | | |
|---|---|---|---|
| 6,590,831 B1 | 7/2003 | Bennett et al. | |
| 8,760,964 B2* | 6/2014 | Moldoveanu | G01V 1/38 367/15 |
| 2008/0228403 A1* | 9/2008 | Robertsson | G06Q 30/0283 702/14 |
| 2010/0302900 A1 | 12/2010 | Tenghamn | |

(Continued)

FOREIGN PATENT DOCUMENTS

| | | |
|---|---|---|
| EP | 2696218 | 2/2014 |
| WO | 2014/198738 | 12/2014 |
| WO | 2015/195939 | 12/2015 |

OTHER PUBLICATIONS

Gerrit Blacquiere, et al., "Robotization in Seismic Acquisition," SEG Houston 2013 Annual Meeting, DOI http://dx.doi.org/10.1190/segam2013-0838.1, pp. 12-16.

(Continued)

*Primary Examiner* — Daniel L Murphy

(57) ABSTRACT

Techniques are disclosed relating to towing source elements and geophysical sensors through a body of water using one or more unmanned tow vessel. In some embodiments, a plurality of unmanned tow vessels are configured to tow one or more signal sources and/or one or more streamers. The plurality of unmanned tow vessels may, in some embodiments, traverse various sail paths along a surface of a body of water in order to acquire geophysical data relating to formations disposed below the bottom of the body of water.

19 Claims, 13 Drawing Sheets

(56) References Cited

U.S. PATENT DOCUMENTS

| 2016/0018540 A1* | 1/2016 | Abma | G01V 1/28 |
|---|---|---|---|
| | | | 367/21 |
| 2016/0069988 A1* | 3/2016 | Foote | G01S 7/52004 |
| | | | 367/13 |
| 2017/0153345 A1 | 6/2017 | Choquer et al. | |

OTHER PUBLICATIONS

Shuki Ronen, et al., "Reducing ocean noise in offshore seismic surveys using low-pressure sources and swarms of motorized unmanned surface vessels," EG Technical Program Expanded Abstracts 2015, 4 pages.

Partial Search Report in GB Application No. 1710393.8 dated Dec. 19, 2017, 4 pages.

* cited by examiner

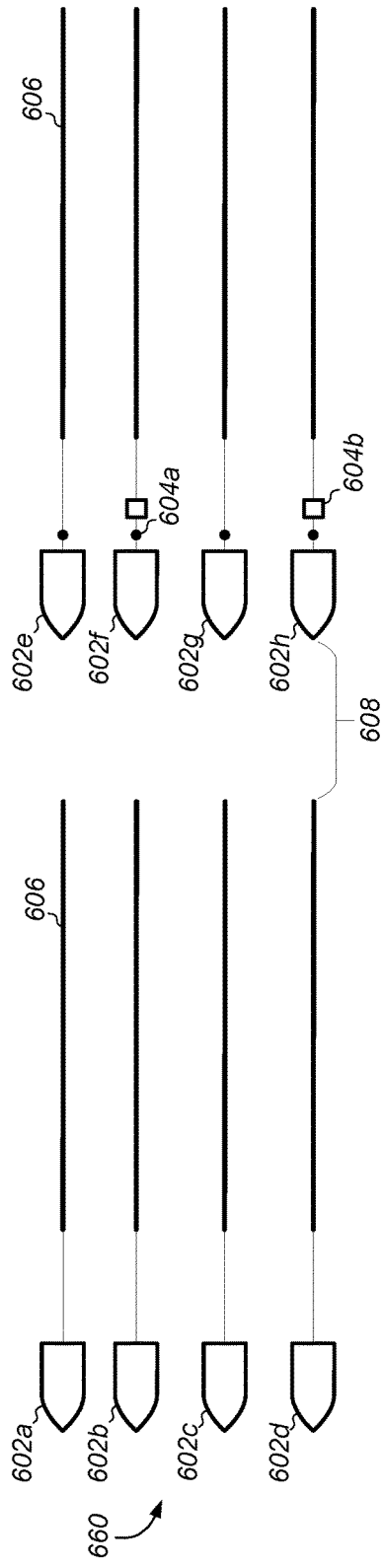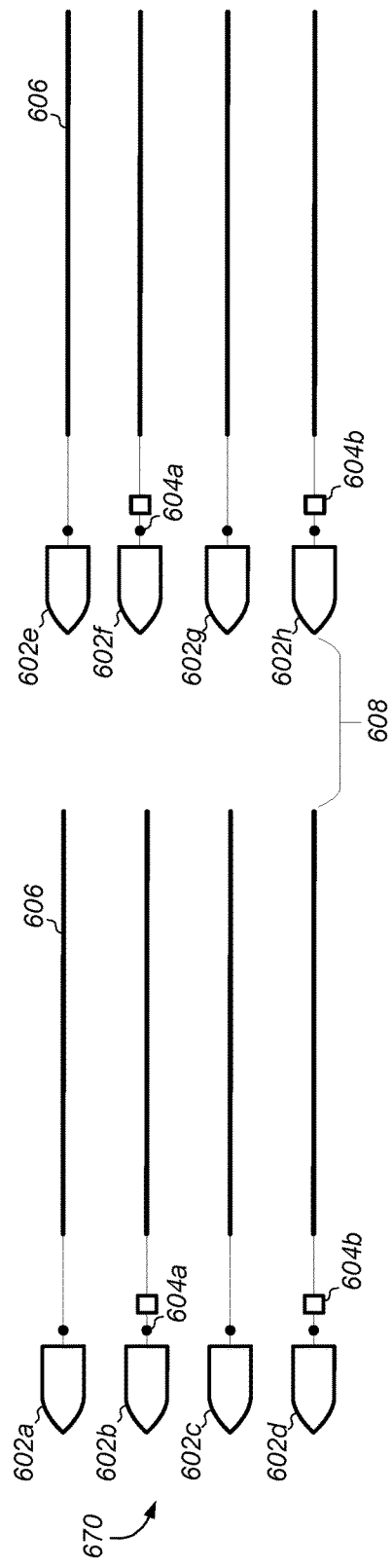

PERFORMING GEOPHYSICAL SURVEYS USING UNMANNED TOW VESSELS

CROSS-REFERENCE TO RELATED APPLICATIONS

This application claims priority to U.S. Provisional Application No. 62/356,132, filed on Jun. 29, 2016, which is incorporated by reference herein in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

In the example of seismic surveying, acoustic waves generated by a seismic source may be transmitted through the water and into the earth's crust, and then reflected back and captured at the towed geophysical sensor along the streamers. Data collected during a marine geophysical survey may be analyzed to locate hydrocarbon-bearing geological structures, and thus determine where deposits of oil and natural gas may be located.

Various challenges may arise in the towing of signal sources and/or streamers by a survey vessel. Embodiments of this disclosure may be used to address some of such challenges, as discussed below.

DETAILED DESCRIPTION

Figure 1:
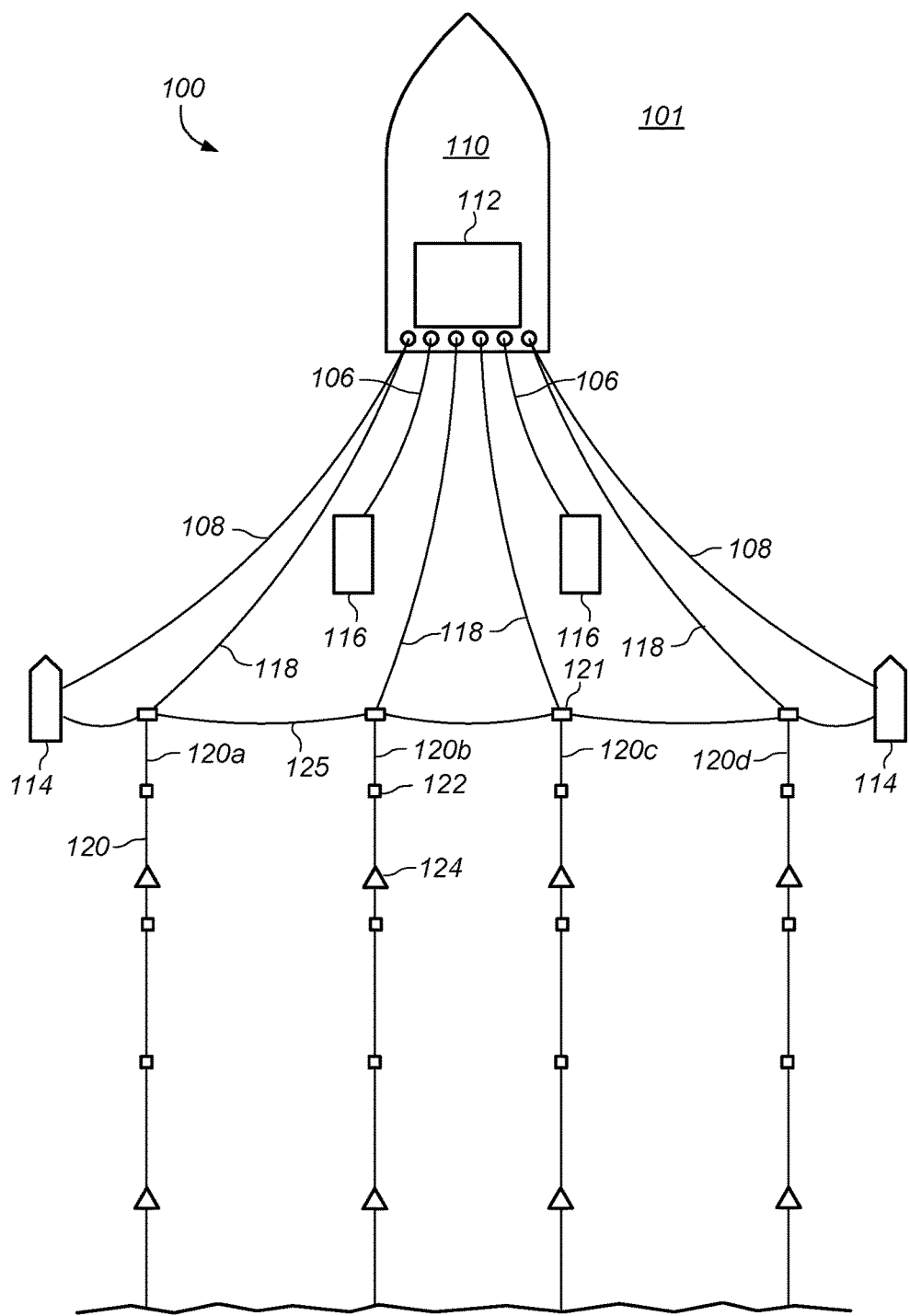
FIG. 1 shows an example embodiment of a marine geophysical survey.
Figure 2:
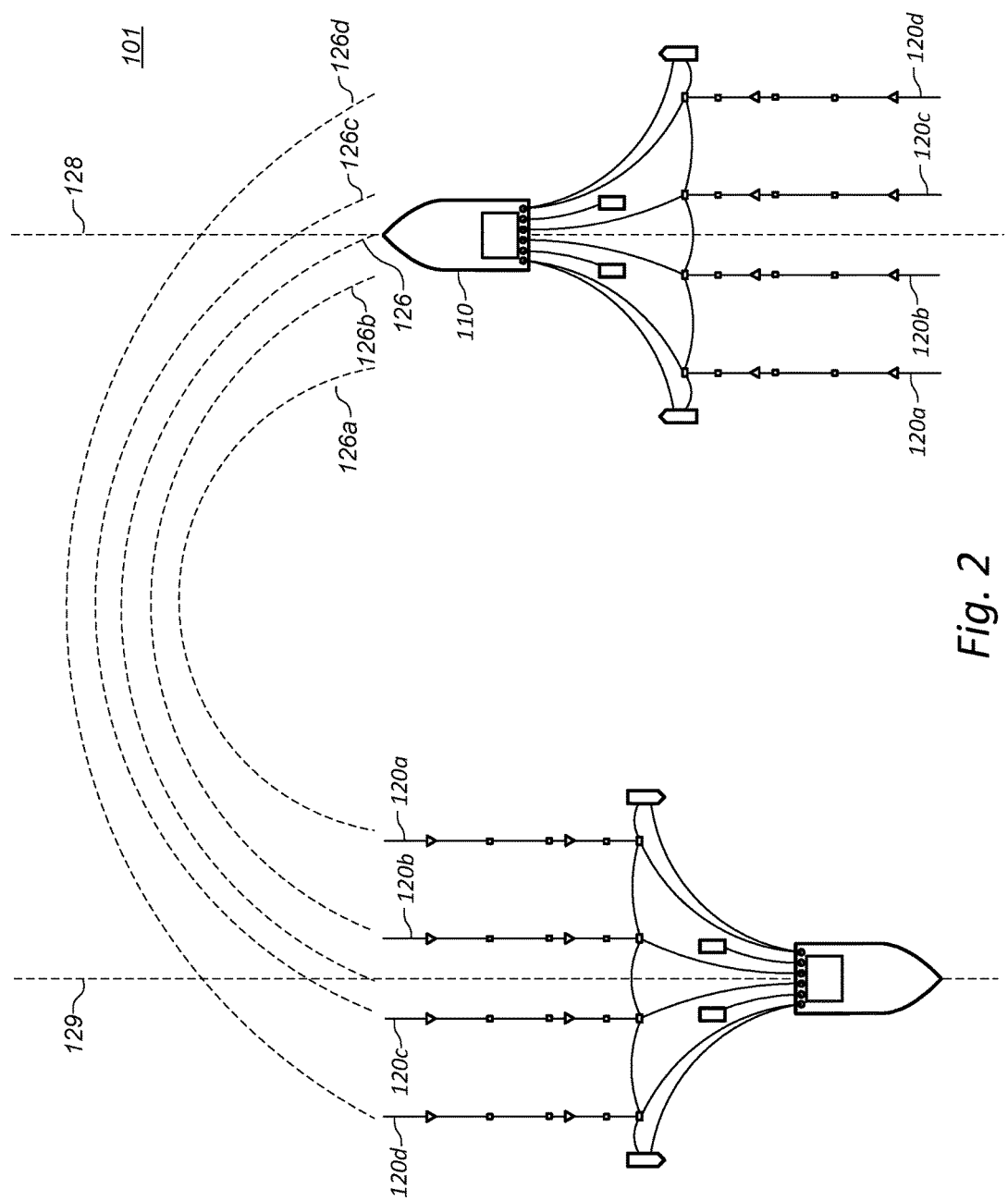
FIG. 2 shows an example embodiment of a survey vessel towing multiple sources and streamers in operation.

This disclosure initially describes, with reference to FIGS. 1 and 2, an overview of a geophysical survey system. It then describes example systems and methods including unmanned tow vessels with reference to FIGS. 3-8. Finally, an example computing system is described with reference to FIG. 9.

Survey Overview

Referring to FIG. 1, an illustration of one embodiment of a geophysical survey system 100 is shown (not necessarily to scale).

System 100 includes survey vessel 110 that may be configured to move along a surface of body of water 101 (e.g., an ocean or a lake) according to various sail paths. In the illustrated embodiment, survey vessel 110 tows signal sources 116 and streamers 120. As used herein, the term "signal source" or "source element" refers to an apparatus that is configured to emit a signal (e.g., acoustic, electromagnetic, etc.) that may be reflected from one or more underlying structures and then measured. As used herein, the term "streamer" refers to an apparatus that may be towed behind a vessel to detect such signals, and thus may include detectors, sensors, receivers, and/or other structures configured to measure the reflected signal (e.g., by using hydrophones, geophones, electrodes, etc. positioned along or in proximity to the streamer).

Signal sources 116 are shown in FIG. 1 being towed by survey vessel 110 using source cables 106. Each of signal sources 116 may include sub-arrays of multiple individual signal sources. For example, signal source 116 may include a plurality of air guns, marine vibrators, and/or electromagnetic signal sources.

Streamers 120 are shown truncated at the bottom of FIG. 1. Streamers 120 may include sensors 122 (e.g., hydrophones, geophones, accelerometers, electromagnetic sensors, etc.). Streamers 120 may further include streamer steering devices 124 (also referred to as "birds") which may provide selected lateral and/or vertical forces to streamers 120 as they are towed through the water, typically based on wings or hydrofoils that provide hydrodynamic lift. Streamers 120 may further include tail buoys (not shown) at their respective back ends. As illustrated in FIG. 1, streamers 120 are coupled to survey vessel 110 via lead-in cables 118 and lead-in cable terminations 121. Lead-in cable terminations 121 may be coupled to or associated with spreader ropes or cables 125 so as to fix the lateral positions of streamers 120 with respect to each other and with respect to a centerline of survey vessel 110. Streamers 120a-120d may be fixed in lateral positions with respect to each other in order to form a survey spread to collect geophysical survey data as survey vessel 110 traverses various sail paths on the surface of body of water 101. As shown, system 100 may also include two paravanes 114 coupled to survey vessel 110 via paravane tow ropes 108. Paravanes 114 are the outermost components in the streamer spread and may be used to provide streamer separation.

In various embodiments, a geophysical survey system may include any appropriate number of towed signal sources 116 and streamers 120. For example, FIG. 1 shows two signal sources 116 and four streamers 120. In other embodiments, however, survey vessel 110 may tow many more streamers. In one embodiment, for example, survey vessel 110 may tow eighteen or more streamers. A geophysical survey system with an increased number of signal sources 116 and streamers 120, in some embodiments, may allow for more survey data to be collected and/or a wider survey spread to be achieved. Towing an increased number of streamers 120 behind survey vessel 110 may, however, tend to cause an increase in hydrodynamic drag forces produced, which in turn may increase the amount of fuel required for a survey and/or decrease survey speed. Further, with the addition of more streamers 120 being towed by survey vessel 110, a smaller proportion of the total hydrodynamic drag produced may be attributable to streamers 120 and a greater proportion may be attributable to other survey equipment used to tow streamers 120. For example, in the embodiment in which survey vessel 110 tows eighteen streamers, a relatively small proportion of the total hydrodynamic drag associated with towing streamers 120 may result from the streamers themselves, while a relatively large proportion of the total hydrodynamic drag may result from towing lead-in cables and other components through the water.

Geodetic position (or "position") of the various elements of system 100 may be determined using various devices, including navigation equipment such as relative acoustic ranging units and/or global navigation satellite systems (e.g., a global positioning system (GPS)).

Survey vessel 110 may include equipment, shown generally at 112 and for convenience collectively referred to as a "recording system." Recording system 112 may include devices such as a data recording unit (not shown separately) for making a record (e.g., with respect to time) of signals collected by various geophysical sensors. For example, in various embodiments, recording system 112 may be configured to record reflected signals received at sensors 122 while survey vessel 110 traverses various sail paths on the surface of body of water 101. Recording system 112 may also include navigation equipment (not shown separately), which may be configured to control, determine, and record, at selected times, the geodetic positions of: survey vessel 110, signal sources 116, streamers 120, sensors 122, etc. Recording system 112 may also include a communication system for communicating with other vessels, on-shore facilities, etc.

In some embodiments, various items of information relating to geophysical surveying, such as data collected by sensors, may be embodied in a "geophysical data product." A geophysical data product may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, tape drives, CDs, DVDs, flash memory, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored as the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

Turning now to FIG. 2, an embodiment in which survey vessel 110 traverses first sail path 128 and subsequent sail path 129 is shown. In this embodiment, survey vessel 110 may traverse first sail path 128 while towing signal sources 116 and streamers 120a-120d. In some embodiments, first sail path 128 may include a route along the surface of body of water 101 to be traversed by survey vessel 110 in order to gather data via streamers 120. For example, first sail path 128 may be chosen to acquire geophysical data from formations disposed below the bottom of body of water 101 along or near first sail path 128.

FIG. 2 further illustrates survey vessel 110 turning from first sail path 128 to subsequent sail path 129. In some embodiments, subsequent sail path 129 may include another route along the surface of body of water 101 to be traversed by survey vessel 110 in order to gather data via streamers 120. For example, subsequent sail path 129 may be chosen to acquire geophysical data from formations disposed below the bottom of body of water 101 along or near subsequent sail path 129. In FIG. 2, subsequent sail path 129 is shown parallel to first sail path 128 for purposes of illustration. However, subsequent sail path 129 need not be parallel to first sail path 128 and may be at another angle relative to first sail path 128.

In FIG. 2, streamers 120a-120d are fixed in a lateral position with respect to each other to form a survey spread perpendicular to first sail path 128 and subsequent sail path 129. While traversing first sail path 128 and subsequent sail path 129, survey vessel 110 may be configured to actuate one or more signal sources 116 and collect data via one or more streamers 120 in the survey spread. The data collected via the one or more streamers 120 may be used, for example, to generate a geophysical data product corresponding to the formations disposed below the bottom of body of water 101 along or near first sail path 128 and subsequent sail path 129.

As shown in FIG. 2, survey vessel 110 turns from first sail path 128 to subsequent sail path 129 along turning route 126. Further, streamers 120a-120d move through body of water 101 from their positions in first sail path 128 to their positions in subsequent sail path 129 along turning routes 126a-126d, respectively. In some embodiments, turning routes 126a-126d may be based, in part, on the turn radii for the inner-most streamer and outer-most streamer. In the illustrated embodiment, for example, streamer 120a is the inner-most streamer and streamer 120d is the outer-most streamer with respect to the turn by survey vessel 110 from first sail path 128 to subsequent sail path 129. During a turn from first sail path 128 to subsequent sail path 129, streamers 120 may move at different speeds and experience different forces relative to one another based, in part, on their position in a survey spread. In some embodiments, the inner-most streamer must maintain a minimum water speed to remain in control during a turn from first sail path 128 to subsequent sail path 129. Further, in such embodiments, the outer-most streamer may not exceed a maximum water speed due to forces that may act on the outer-most streamer during the turn from first sail path 128 to subsequent sail path 129. Therefore, in such embodiments, turning routes 126a-126d may have a turning radius that will allow the inner-most streamer to maintain the minimum necessary water speed without allowing the outer-most streamer to exceed a maximum water speed. In some embodiments, the determination of turning routes 126a-126d may result in survey vessel 110 turning at a turning radius sufficient to address both of these considerations. However, in such an embodiment, one or more of streamers 120, for example streamer 120a in FIG. 2, may turn from first sail path 128 to subsequent sail path 129 more slowly than it may if it were configured to turn independently of streamers 120b-120d. Further, in this embodiment, one or more of streamers 120, for example streamer 120d in FIG. 2, may turn at a wider turning radius (e.g., along turning route 126d) than it may if it were configured to turn independently of streamers 120a-120c. This may result, in some embodiments, in a slower total time required to complete a geophysical survey.

Example Embodiments

Figure 3:
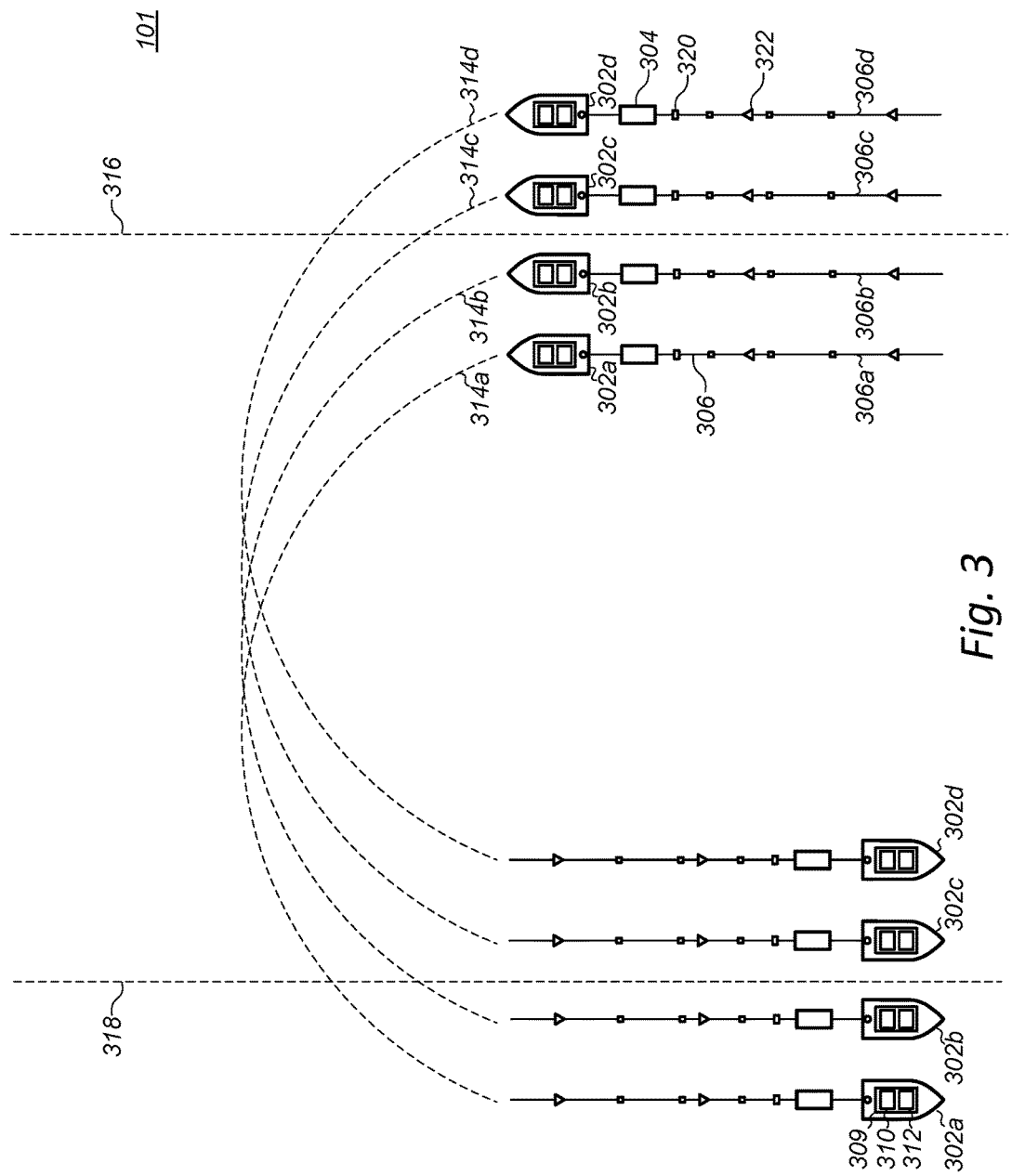
FIG. 3 shows an example embodiment of a plurality of unmanned tow vessels turning from a first sail path to a subsequent sail path, according to some embodiments.

Turning now to FIG. 3, an embodiment in which a plurality of unmanned tow vessels 302 traverse first sail path 316 and subsequent sail path 318 is shown (not to scale). In this embodiment, the unmanned tow vessels 302 may be configured to tow one or more streamers 306. Streamers 306 are shown truncated in FIG. 3. In FIG. 3, each unmanned tow vessel 302 is shown towing only one streamer 306 for clarity. However, in other embodiments, some or all of unmanned tow vessels 302 may tow one or more streamers 306. For example, in one embodiment, a subset of the unmanned tow vessels are configured to tow three streamers 306. Streamers 306 may include sensors 320 (e.g., hydrophones, geophones, electromagnetic sensors, etc.). Streamers 306 may further include streamer steering devices 322 (also referred to as "birds") which may provide selected lateral and/or vertical forces to streamers 306 as they are towed through the water. Streamers 306 may further include tail buoys (not shown) at their respective back ends.

In various embodiments, the unmanned tow vessels 302 may be configured to tow one or more signal sources 304, which may include any suitable impulsive or non-impulsive signal sources, such as air guns, electrical vibrator sources, bender sources, etc. Further, each of signal sources 304 may include sub-arrays of multiple individual signal sources. For some signal sources 304 (e.g., non-impulsive sources, such as electrical vibrator sources, bender sources, etc.), a source system may include individual narrowband sources. In one embodiment, for example, signal sources 304 may include narrowband sources in a low-frequency range (e.g., less than 6 Hz), a mid-frequency range (e.g., between 6 Hz and 12 Hz), and a high-frequency range (e.g., greater than 12 Hz). Note, however, that these frequency ranges are provided merely as examples and are not intended to limit the scope of this disclosure. The signal sources 304 may include sources in any suitable frequency ranges, according to various embodiments. Also, note that although three frequency ranges have been described, any suitable number of frequency ranges of sources may be used, according to various embodiments.

Note that, although each of the unmanned tow vessels 302 in FIG. 3 are shown towing both signal sources 304 and streamers 306, this configuration is depicted only as an example and is not intended to limit the scope of the present disclosure. For example, in various embodiments, one or more of the unmanned tow vessels 302 may tow one or more signal sources 304 without also towing streamers 306, one or more of the unmanned tow vessels 302 may tow one or more streamers 306 without also towing signal sources 304, or one or more of the unmanned tow vessels 302 may tow both one or more signal sources 304 and one or more streamers 306. For example, in one particular embodiment, a first unmanned tow vessel 302 may be configured to tow one or more signal sources 304 and a second unmanned tow vessel 302 may be configured to tow one or more streamers 306. Thus, in various embodiments, any desired subset of unmanned tow vessels 302 may be configured to tow only signal sources 304, any desired subset may be configured to tow only streamers 306, and any desired subset may be configured to tow both signal sources 304 and streamers 306.

In various embodiments, the types of signal sources 304 towed by unmanned tow vessels 302 may vary from vessel to vessel. For example, in some embodiments, one or more of unmanned tow vessels 302 may be configured to tow one or more narrowband signal sources 304. As explained in more detail below with reference to FIG. 4, in such embodiments, the plurality of unmanned tow vessels 302 may tow a relatively low number of low-frequency signal sources, a higher number of mid-frequency signal sources, and a highest number of high-frequency signal sources.

As shown in FIG. 3, each unmanned tow vessel 302 may include a control unit 309, which in turn may include a recording system 310 and navigation equipment 312. Recording system 310 may include devices such as a data recording unit (not shown separately) for making a record with respect to time of signals collected by various geophysical sensors. For example, in various embodiments, recording system 310 for each of the unmanned tow vessels 302 may be configured to store as raw data the reflected signals received at sensors 320 while unmanned tow vessels 302 traverse various sail paths on the surface of body of water 101. The data collected via the one or more streamers may be recovered for use in generating a geophysical data product. For example, recording system 310 for unmanned tow vessels 302 may be communicatively coupled to (e.g., in electronic communication with) each other and/or other vessels, such as a recording vessel or a survey vessel. Recording system 310 may be configured to wirelessly transmit the data collected via the one or more streamers. For example, recording system 310d may be configured to wirelessly transmit the data collected via streamer 306d to a separate survey vessel or recording vessel (not shown). In some embodiments, the wirelessly transmitted data may include the raw data collected via the one or more streamers. In other embodiments, recording system 310 may process the raw data (e.g., perform noise filtering, etc.) prior to wirelessly transmitting the data to another vessel, such as a recording vessel or a survey vessel. However, in some embodiments, recording system 310 may transmit both raw data and processed data to one or more other vessels.

Further, in various embodiments, the data collected via the one or more streamers may be recovered using techniques other than and/or in addition to wireless transmission. For example, in some embodiments, the data collected via the one or more streamers may be recovered by another vessel, such as a manned work boat, another unmanned vessel, and/or another support vessel. Further, in an embodiment, the data may be recovered by use of one or more aerial drones configured to recover data from one or more of the unmanned tow vessels 302. Further, in an embodiment, the data may be recovered after unmanned tow vessels 302 have completed a survey.

Further, recording system 310 may also be configured to wirelessly receive signals from other vessels, for example a support vessel or survey vessel, that can remotely control unmanned tow vessels 302 to actuate signal sources 304 and collect data via streamers 306. Each unmanned tow vessel 302 may also include navigation equipment 312, which may be configured to control, determine, and record, at selected times, the geodetic positions of: unmanned tow vessels 302, signal sources 304, streamers 306, sensors 320, etc. Navigation equipment 312 may further be configured to wirelessly receive a control signal, for example, from a survey vessel (not separately shown in FIG. 3). Further, in some embodiments, navigation equipment 312 may be configured to store one or more definitions of formations for unmanned tow vessels 302. For example, navigation equipment 312 may store definitions for one or more formations that each include one or more orderings of unmanned tow vessels 302 at lateral positions with respect to each other. Navigation equipment 312 for each respective unmanned tow vessel 302 may be configured to control the position of the unmanned tow vessel 302 as it moves across the surface of body of water 11. For example, in some embodiments, navigation equipment 312d may control the position of unmanned tow vessel 302d based, in part, on the control signal wirelessly received from the survey vessel. In other embodiments, however, navigation equipment 312d may autonomously control the position of unmanned tow vessel 302d, rather than controlling the position of unmanned tow vessel 302d based on a control signal wirelessly received from the survey vessel. For example, in such an embodiment, navigation equipment 312d may autonomously control the position of unmanned tow vessel 302d based on the one or more definitions of formations stored by navigation equipment 312d. Further, in some embodiments, the plurality of unmanned tow vessels may be configured to turn toward a subsequent sail path autonomously, for example using navigation equipment 312.

As shown in FIG. 3, unmanned tow vessels 302a-302d may traverse first sail path 316 while towing signal sources 304 and streamers 306, respectively. In some embodiments, first sail path 316 may include a route along the surface of body of water 101 to be traversed by unmanned tow vessels 302 in order to gather data via streamers 306. For example, first sail path 316 may be chosen to acquire geophysical data relating to formations disposed below the bottom of body of water 101 along or near first sail path 316. In FIG. 3, first sail path 316 and subsequent sail path 318 are show as being routes in a substantially straight direction along the surface of body of water 101. However, this depicted embodiment is provided merely for clarity and is not intended to limit the scope of the present disclosure. In other embodiments, for example, first sail path 316 and/or subsequent sail path 318 may include other routes, such as a curved or otherwise not substantially straight route along the surface of body of water 101.

In FIG. 3, unmanned tow vessels 302 are shown traversing first sail path 316 in a first formation. In the illustrated embodiment, unmanned tow vessels 302 may be located in lateral positions with respect to each other in order to form a survey spread to collect geophysical survey data as unmanned tow vessels 302 traverse various sail paths on the surface of body of water 101. The first formation may include a first ordering of unmanned tow vessels 302 at lateral positions with respect to first sail path 316 and the other unmanned tow vessels. For example, the first ordering shown in FIG. 3, from left to right with respect to the direction of motion of the unmanned tow vessels 302, includes: 302a, 302b, 302c, and 302d. While traversing first sail path 316, unmanned tow vessels 302 may be configured to actuate one or more of the signal sources 304 and collect data via one or more of the streamers 306. In one embodiment, unmanned tow vessels 302 may be remotely controlled, for example by a survey vessel via recording system 310, to actuate at least one of the signal sources 304 and collect data via at least one of the streamers 306. The data collected via streamers 306 may be used, for example, to generate a geophysical data product corresponding to formations disposed below the bottom of body of water 101 along or near first sail path 316.

In the illustrated embodiment, unmanned tow vessels 302 may be configured to turn from first sail path 316 to subsequent sail path 318. In various embodiments, each unmanned tow vessel 302 may be configured to turn independently of the other unmanned tow vessels 302, such that the turning radius of one unmanned tow vessel is not dependent upon the turning radii of the other unmanned tow vessels. In some embodiments, unmanned tow vessels 302 may be remotely controlled, for example by a survey vessel via navigation equipment 312, to turn from first sail path 316 to subsequent sail path 318. As shown in FIG. 3, unmanned tow vessels 302a-302d may be configured to turn from first sail path 316 to subsequent sail path 318 along turning routes 314a-314d, respectively. In some embodiments, the turning radii for turning routes 314a-314d may be substantially the same, such that each unmanned tow vessel 302a-302d may turn from first sail path 316 to subsequent sail path 318 at a substantially similar radius. For the purposes of this disclosure, two numbers being "substantially similar" is defined to mean that those numbers are within 20% of one another. In other embodiments, however, turning routes 314a-314d may vary such that only some or none of the turning radii of turning routes 314a-314d are substantially the same. In various embodiments, the turning radii of turning routes 314a-314d may be smaller than the turning radii of turning routes 126a-126d for one or more of the streamers 120a-120d in FIG. 2. For example, the turning radius of turning route 314d of unmanned tow vessel 302d, and thus streamer 306d, in FIG. 3 may be smaller than the turning radius of turning route 126d of streamer 120d in FIG. 2. In some embodiments, turning at a smaller turning radius may enable unmanned tow vessels 302 to turn from first sail path 316 to subsequent sail path 318 faster than survey vessel 110 towing signal sources 116 and streamers 120. Such a result may enable unmanned tow vessels 302 to complete a geophysical survey more quickly than survey vessel 110 of FIG. 2.

Turning routes 314a-314d are provided as an example and are not intended to limit the scope of the present disclosure. In some embodiments, unmanned tow vessels 302a-302d may be configured to turn from first sail path 316 to subsequent sail path 318 along turning routes other than turning routes 314a-314d. For example, in some embodiments, various obstructions may be present between first sail path 316 and subsequent sail path 318. In such embodiments, one or more of unmanned tow vessels 302a-302d may be remotely controlled, for example by a survey vessel via navigation equipment 312, to turn from first sail path 316 to subsequent sail path 318 along turning routes other than 314a-314d to avoid the various obstructions. Further, in such embodiments, unmanned tow vessels 302a-302d may be configured to traverse subsequent sail path 318 in a second formation despite turning along turning routes other than turning routes 314a-314d.

In some embodiments, unmanned tow vessels 302 may be configured to actuate one or more of the signal sources 304 and collect data via one or more of the streamers 306 while turning from first sail path 316 to subsequent sail path 318. For example, in some embodiments, unmanned tow vessels 302 may be remotely controlled, for example by a survey vessel via recording system 310, to actuate at least one of signal sources 304 and collect data via at least one of the streamers 306. In other embodiments, however, unmanned tow vessels 302 may be configured to turn from first sail path 316 to subsequent sail path 318 without actuating at least one of the one or more signal sources 304 while turning.

In FIG. 3, unmanned tow vessels 302 are also shown traversing subsequent sail path 318 in a second formation. In some embodiments, subsequent sail path 318 may be a second sail path immediately after first sail path 316. However, the subsequent sail path 318 need not be the second sail path immediately following the first sail path and, in other embodiments, subsequent sail path 318 may be a third, fourth, etc. sail path after first sail path 316. In some embodiments, the second formation may include a second, different ordering of the unmanned tow vessels 302 at lateral positions with respect to subsequent sail path 318 and the other unmanned tow vessels. For example, the second ordering shown in FIG. 3, from left to right with respect to the direction of motion of the unmanned tow vessels 302, includes: 302d, 302c, 302b, and 302a. In such an embodiment, the second, different ordering with respect to subsequent sail path 318 is a "mirror image" of the first ordering with respect to first sail path 316. That is, the order of the unmanned tow vessels 302 in the subsequent sail path 318 is reversed relative to the ordering of the unmanned tow vessels 302 in the first sail path 316. However, the second ordering need not necessarily be a mirror image of the first ordering. In other embodiments, only a subset of the unmanned tow vessels 302 may change their lateral positions with respect to subsequent sail path 318 and the other unmanned tow vessels during the turn. While traversing subsequent sail path 318, unmanned tow vessels 302 may be configured to actuate one or more of the signal sources 304 and collect data via one or more of the streamers 306. In one embodiment, unmanned tow vessels 302 may be remotely controlled, for example by a survey vessel via recording system 310, to actuate at least one of the signal sources 304 and collect data via at least one of the streamers 306. Note that, in various embodiments, the one or more signal sources 304 actuated while the unmanned tow vessels 302 traverse the subsequent sail path 318 need not necessarily be the same one or more signal sources 304 actuated while the unmanned tow vessels 302 traverse the first sail path 316. That is, any suitable subset of the one or more signal sources 304 may be actuated while the unmanned tow vessels 302 are traversing the first sail path 316 or subsequent sail path 318. Similarly, in various embodiments, the one or more streamers 306 that collect data while the unmanned tow vessels are traversing the subsequent sail path 318 need not necessarily be the same as the one or more streamers 306 that collect data while the unmanned tow vessels 302 are traversing the first sail path 316. The data collected via the one or more streamers 306 may be used, for example, to generate a geophysical data product corresponding to formations disposed below the bottom of body of water 11 along subsequent sail path 318.

Performing geophysical surveys using unmanned tow vessels as disclosed herein may provide various improvements to the operation of the survey system, and particularly may allow for improvements to the acquisition efficiency of the survey system. For example, as noted above with reference to FIG. 1, increasing the number of streamers towed by a survey vessel 110 produces a corresponding increase in hydrodynamic drag. This increase in drag, in turn, increases the amount of fuel required to perform a geophysical survey. Further, as noted above, a substantial portion (e.g., 80%) of the overall drag produced by survey system 100 of FIG. 1 may be attributable to paravanes, lead-in cables, tow ropes, and other survey equipment used to tow and distribute streamers, rather than to the streamers themselves. Performing a geophysical survey using unmanned tow vessels, however, improves the survey system by reducing the amount of survey equipment required to tow and distribute streamers and, therefore, reducing the overall drag produced. Accordingly, performing a geophysical survey using unmanned tow vessels may also reduce the amount of fuel required for the survey.

Further, in various embodiments, using unmanned tow vessels to perform a geophysical survey may allow for improved scalability of a survey system. Consider, for example, increasing the width of survey system 100 of FIG. 1 by adding an additional streamer 120 spaced at 100 meters to both sides of the streamer spread. In this example, while the overall width of the survey system 100 would increase by 200 meters, the acquisition width may only increase, for example, by 100 meters. Performing a geophysical survey system using unmanned tow vessels, by contrast, may allow for greater scalability. Consider, for example, adding an additional unmanned tow vessel 302, towing one or more signal sources 304 and one or more streamers 306, spaced at 100 meters to both sides of the survey spread shown in FIG. 3. In this example, both the overall width of the survey spread and the acquisition width of the survey spread would increase by 200 meters. Thus, in various embodiments, using unmanned tow vessels to perform geophysical surveys may allow for the crossline distribution of signal sources 304 as well as streamers 306, which in turn may allow for improved scalability of the survey system.

Figure 4:
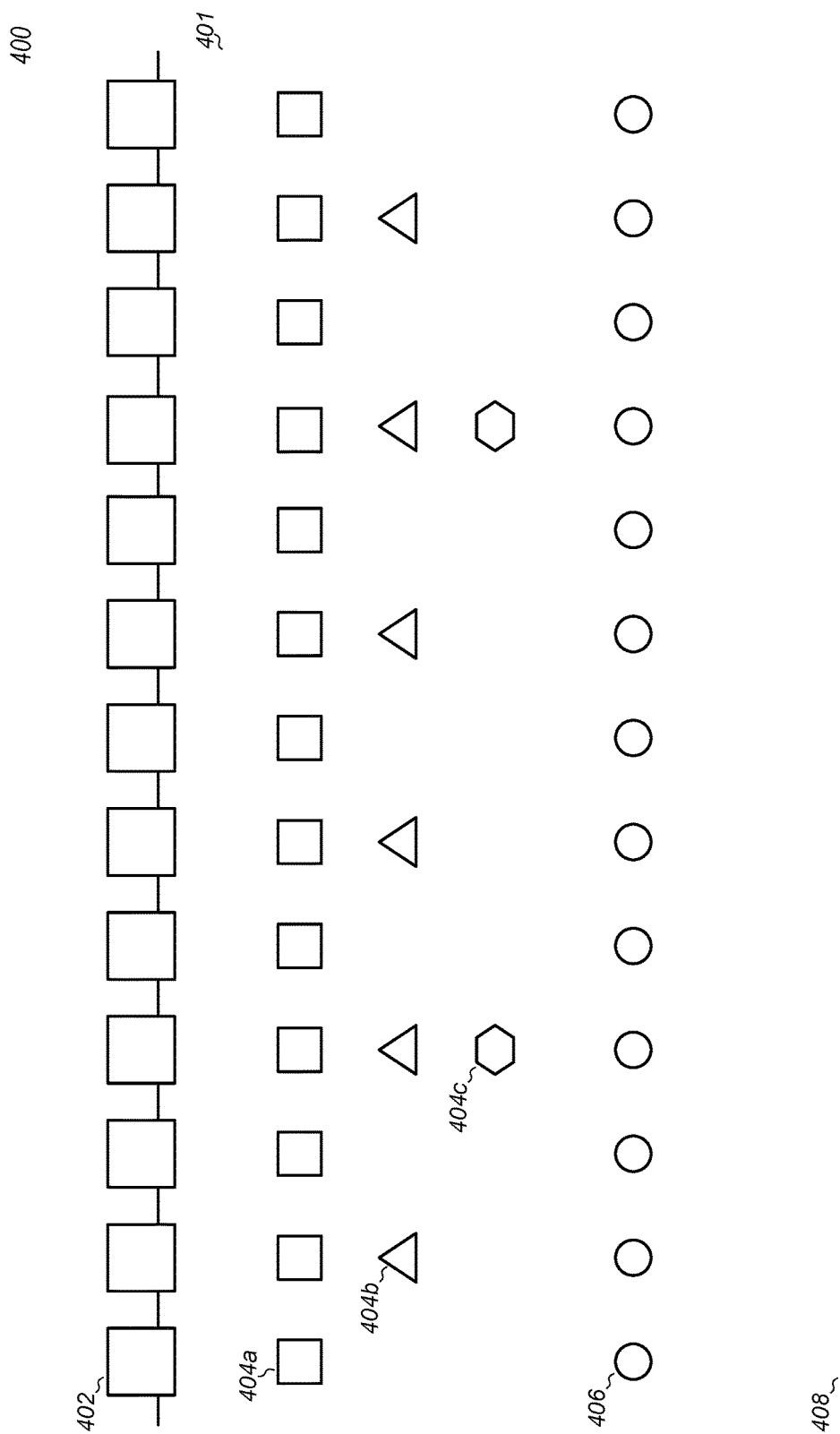
FIG. 4 shows a rear elevation view of a geophysical survey system, according to some embodiments.

Referring now to FIG. 4, a block diagram of an example geophysical survey system 400 is shown, according to some embodiments. FIG. 4 shows a rear elevation view of geophysical survey system 400 looking along a sail path from behind the streamer spread. As shown in FIG. 4, geophysical survey system 400 includes a plurality of unmanned tow vessels 402 positioned in a crossline direction to form a survey spread. As used herein, the term "crossline direction" is to be understood according to its ordinary meaning in the art, which includes a lateral direction perpendicular to a given sail path. The plurality of unmanned tow vessels 402 are shown configured to traverse a sail path while towing one or more streamers and a set of source elements. In FIG. 4, for example, each of the unmanned tow vessels 402 is shown towing one or more signal sources, such as high-frequency signal sources 404a, mid-frequency signal sources 404b, or low-frequency signal sources 404c, and a streamer 406. Note that, in FIG. 4, various components, such as tow ropes, lead-in cables, etc., are omitted for clarity. In FIG. 4, each unmanned tow vessel 402 is shown towing only one streamer 406 for clarity. In other embodiments, however, some or all of unmanned tow vessels 402 may tow any suitable number of streamers 406. Additionally, in some embodiments, one or more of unmanned tow vessels 402 may be configured to tow one or more signal sources 404 without also towing a streamer 406. Further, one or more of unmanned tow vessels 402 may be configured to tow one or more streamers 406 without also towing a signal source 404, in some embodiments.

As noted above, in various embodiments, the types of signal sources 404 towed by unmanned tow vessels 402 may vary between vessels. For example, in some embodiments, the plurality of unmanned tow vessels 402 may tow a relatively low number of low-frequency signal sources 404c, a higher number of mid-frequency signal sources 404b, and a highest number of high-frequency signal sources 404a. In the embodiment depicted in FIG. 4, thirteen unmanned tow vessels 402 are shown, each towing a high-frequency signal source 404a. Of the thirteen unmanned tow vessels 402, six are shown towing both high- and mid-frequency sources 404a-404b. Additionally, two of the thirteen unmanned tow vessels 402 are shown towing high-, mid-, and low-frequency signal sources 404a-404c. Thus, of the set of source elements, a subset of high-frequency signal sources 404a are towed at a first source density relative to a width of the survey spread, a subset of mid-frequency signal sources 404b are towed at a second source density relative to the width of the survey spread, which, in some embodiments, may be lower than the first source density, and a subset of low-frequency signal sources 404c are towed at a third source density relative to the width of the survey spread, which, in some embodiments, may be lower than at least one of the first source density or the second source density. Further, in some embodiments, the third source density may be lower than both the first source density and the second source density. Note that, although three frequency ranges, and thus three source types, are described in reference to FIG. 4, any suitable number of frequency ranges, and corresponding source types, may be implemented, according to various embodiments.

Distributing the signal sources 404 as described above may provide various advantages. For example, in operation of a signal source during a geophysical survey, seismic energy released by the signal source is attenuated as a function of the distance propagated. Further, higher frequency seismic energy is attenuated more quickly than lower frequency seismic energy. Thus, in a survey system, such as geophysical survey system 100 of FIG. 1, for example, with a wide streamer spread in which the signal sources are towed in a central location relative to the streamer spread, the level of the seismic signals collected by the outer streamers tends to degrade, particularly at higher frequencies. In the geophysical survey system 400 of FIG. 4, by contrast, the distribution of high- and mid-frequency sources 404a-404b across unmanned tow vessels 402 according to the first and second source density, respectively, may mitigate the signal degradation due to attenuation. Consider, for example, the leftmost unmanned tow vessel 402 in FIG. 4, shown towing a high-frequency signal source 404a and a streamer 406. The propagation distance for seismic energy originating from the leftmost high-frequency signal source 404a, to the floor 408 of body of water 401, and back to the leftmost streamer 406 is shorter than a propagation distance for seismic energy originating from a seismic source more-centered in the streamer spread (such as signal source 116 in FIG. 1), to the floor 408 of body of water 401, and to the leftmost streamer 406. This reduced distance may result in less attenuation of seismic energy and, accordingly, less signal degradation.

Further, signal sources 404a-404c may present different towing requirements based on their type. For example, the size of a given non-impulsive signal source may correspond to the frequency range of the seismic energy emitted by that given signal source. In various embodiments, high-frequency signal sources 404a may be relatively small in size and, thus, easier to tow with an unmanned tow vessel 402. Similarly, in some embodiments, mid-frequency signal sources 404b may be larger than the high-frequency signal sources 404a, and low-frequency signal sources 404c may be larger than either of the high- or mid-frequency signal sources 404a-404b. Accordingly, it may be relatively more difficult to tow a mid-frequency signal source 404b than a high-frequency signal source 404a, and more difficult still to tow a low-frequency signal source 404c. Thus, in some embodiments, one or more of the signal sources 404a-404c (e.g., mid- or low-frequency signal sources 404b-404c) may be towed by a separate vessel, for example a support vessel or other survey vessel (not separately shown in FIG. 4). Further, in accordance with some embodiments of this disclosure, a source system (including, for example, high-, mid-, or low-frequency signal sources) may be distributed onto multiple unmanned tow vessels as described above. Distributing the source system over multiple unmanned tow vessels may permit the signal sources, such as the low-frequency portion of the source system, to be more easily towed and handled. In general, any desired first subset of the unmanned tow vessels may tow high-frequency signal sources, any desired second subset may tow mid-frequency signal sources, and any desired third subset may tow low-frequency signal sources. In some embodiments, at least one unmanned tow vessel may be an element of each of the first subset and the second subset, the first subset, second subset, and third subset, etc. That is, according to some embodiments, at least one unmanned tow vessel may carry any suitable combination of high-, mid-, or low-frequency signal sources 404a-404c.

Figure 5A:
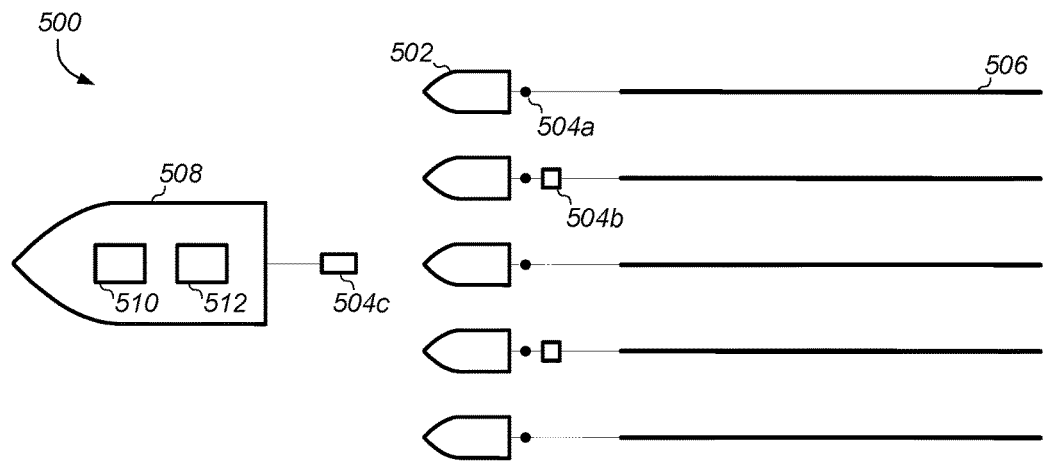
FIGS. 5A-5B show an example geophysical survey system including unmanned tow vessels, according to some embodiments.
Figure 5B:
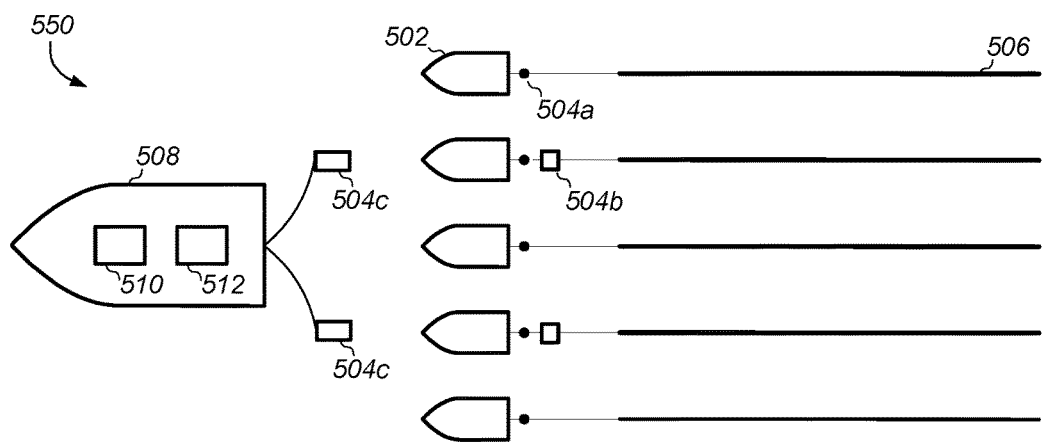

Turning now to FIG. 5A, a block diagram illustrating an example geophysical survey system 500 is shown, according to some embodiments. In the illustrated embodiment, geophysical survey system 500 includes unmanned tow vessels 502, which may be configured to tow one or more signal sources 504 and one or more streamers 506. Note that, although each of unmanned tow vessels 502 in FIG. 5 are shown towing one or more signal sources 504 and a streamer 506, this embodiment is depicted only as an example and is not intended to limit the scope of the present disclosure. For example, in some embodiments, one or more of unmanned tow vessels 502 may be configured to tow one or more signal sources 504 without also towing a streamer 506. Further, in some embodiments, one or more unmanned tow vessels 502 may be configured to tow one or more streamers 506 without also towing a signal source 504. Additionally, as explained above with reference to FIG. 4, the types of signal sources 504 towed by unmanned tow vessels 502 may vary between vessels. For example, in the embodiments depicted in FIGS. 5A-B, each of the unmanned tow vessels 502 are configured to tow a high-frequency signal source 504a, while a subset of unmanned tow vessels 502 are configured to also tow a mid-frequency signal source 504b.

Geophysical survey system 500 further includes survey vessel 508. In the illustrated embodiment, survey vessel 508 includes handling equipment 510. In various embodiments, handling equipment 510 may be configured to deploy or recover one or more unmanned tow vessels 502. For example, in one embodiment, handling equipment 510 may include one or more davits, winches, pulleys, cranes, derricks, A-frames, or any other suitable devices. In such an embodiment, handling equipment 510 may be configured to lower one or more unmanned tow vessels 502 from a storage area of survey vessel 508 and into the water. Further, in such an embodiment, handling equipment 510 may also be configured to hoist one or more unmanned tow vessels 502 from the water and onto a storage area of survey vessel 508.

Survey vessel 508 may also include communication system 512. In various embodiments, communication system 512 may be configured to remotely control unmanned tow vessels 502. In one embodiment, communication system 512 may be operable to remotely control unmanned tow vessels 502 to traverse a sail path, for example first sail path 316 in FIG. 3, in a first formation. In one embodiment, the first formation may be based on first positions for each of the unmanned tow vessels 502, which may be defined relative to survey vessel 508. While unmanned tow vessels 502 are traversing the first sail path, communication system 512 may be operable to remotely control unmanned tow vessels 502 to actuate one or more signal sources 504 and collect data via one or more streamers 506. Communication system 512 may further be operable to remotely control unmanned tow vessels 502 to turn from the first sail path toward a subsequent sail path, for example subsequent sail path 318 in FIG. 3, and traverse the subsequent sail path in a second formation. The second formation may include a different arrangement of the unmanned tow vessels 502 from the first formation. In an embodiment, the second formation may be based on a second position for each of the unmanned tow vessels 502, which may be defined relative to survey vessel 508. While unmanned tow vessels 502 are traversing the subsequent sail path, communication system 512 may be operable to remotely control unmanned tow vessels 502 to actuate one or more signal sources 504 and collect data via one or more streamers 506.

As shown in FIGS. 5A-5B, survey vessel 508 may be configured to tow one or more signal sources 504 in various embodiments. For example, in FIG. 5A, survey vessel 508 is shown towing a low-frequency signal source 504c. As discussed above, in some embodiments, the towing requirements of a signal source 504 may vary depending on its type (e.g., high-, mid-, or low-frequency non-impulsive signal sources). For example, low-frequency non-impulsive signal sources may be larger than high-frequency signal sources and thus less difficult to tow. Further, as noted above, it may be desirable in some embodiments to tow fewer low-frequency signal sources than mid- or high-frequency signal sources during a geophysical survey. Thus, as depicted in FIGS. 5A-5B, in some embodiments, a geophysical survey system may include, in addition to a plurality of unmanned tow vessels 502, a separate vessel, such as survey vessel 508, configured to tow a low-frequency signal source 504c.

Similarly, as shown in FIG. 5B, survey vessel 508 in a geophysical survey system 550 may be configured to carry multiple low-frequency signal sources 504c. In some embodiments, the low-frequency signal sources 504c towed by survey vessel 508 may be distributed along the width of the spread of unmanned tow vessels 502, for example using paravanes or any other suitable device. In one embodiment, for example, the distance between the low-frequency signal sources 504c of FIG. 5B may be about half of the total width of the spread of unmanned tow vessels 502. Note, however, that this distance is provided merely as an example and is not intended to limit the scope of the present disclosure. Survey vessel 508 may tow low-frequency signal sources 504c at any suitable distance apart in various embodiments. Further, note that, although survey vessel 508 is shown only towing low-frequency signal sources 504c, survey vessel 508 may tow any suitable number or configuration of signal sources in accordance with the present disclosure. For example, in one embodiment, survey vessel 508 may tow both mid- and low-frequency signal sources 504b-504c distributed along the width of the survey spread.

In various embodiments, performing a geophysical survey using one or more unmanned vessels as described herein may allow for survey configurations that may not be possible or practical to implement without such vessels. With reference to FIGS. 6A-6H, various survey configurations are depicted for performing a geophysical survey using unmanned tow vessels, according to various embodiments of the present disclosure.

Figure 6A:
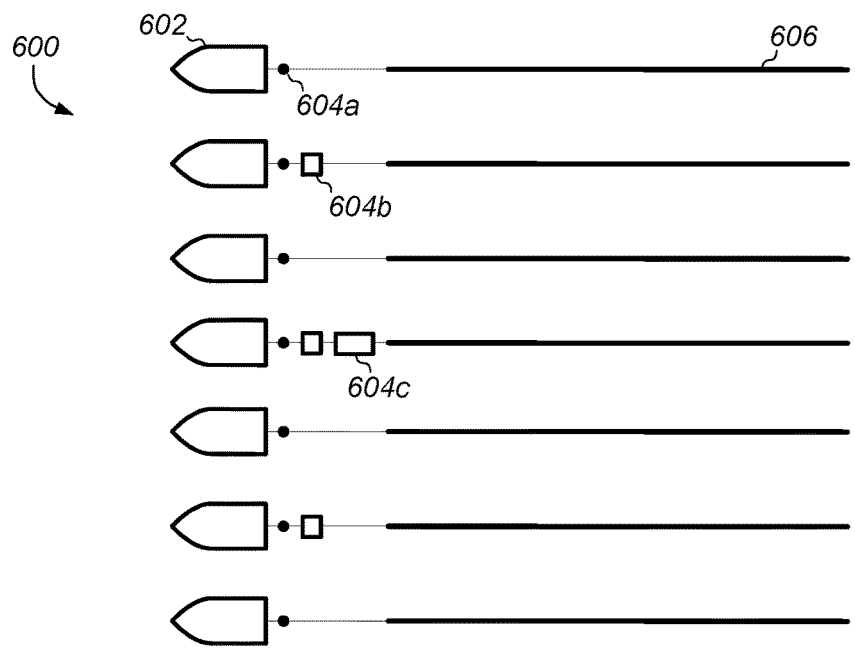
FIGS. 6A-6I show example survey configurations including unmanned tow vessels, according to some embodiments.

Turning to FIG. 6A, for example, a survey configuration 600 is depicted in which a plurality of unmanned tow vessels 602 are distributed in a crossline direction to form a survey spread. In the depicted embodiment, the plurality of unmanned tow vessels 602 are configured to traverse a sail path along a body of water while towing a plurality of signal sources 604 and a plurality of streamers 606. While traversing the sail path, the plurality of unmanned tow vessels 602 may be configured to actuate one or more of the signal sources 604 and collect data via one or more of the plurality of streamers 606. As described above, the types of signal sources 604 towed by the unmanned tow vessels 602 may vary. For example, in various embodiments, the unmanned tow vessels 602 may be configured to tow one or more low-frequency signal sources 604c and one or more high-frequency signal sources 604a, where the number of low-frequency signal sources 604c is different than the number of high-frequency signal sources 604a. In the illustrated survey configuration 600, each of the unmanned tow vessels 602 is shown towing a high-frequency signal source 604a and a streamer 606. Further, a first subset of the unmanned tow vessels 602 are shown also towing, in addition to a high-frequency signal source 604a and a streamer, a mid-frequency signal source 604b. Additionally, a second subset of the unmanned tow vessels 602 are shown towing high-, mid-, and low frequency signal sources 604a-604c and a streamer 606. Survey configuration 600 may, in various embodiments, be advantageous in addressing the attenuation considerations discussed above.

Figure 6B:
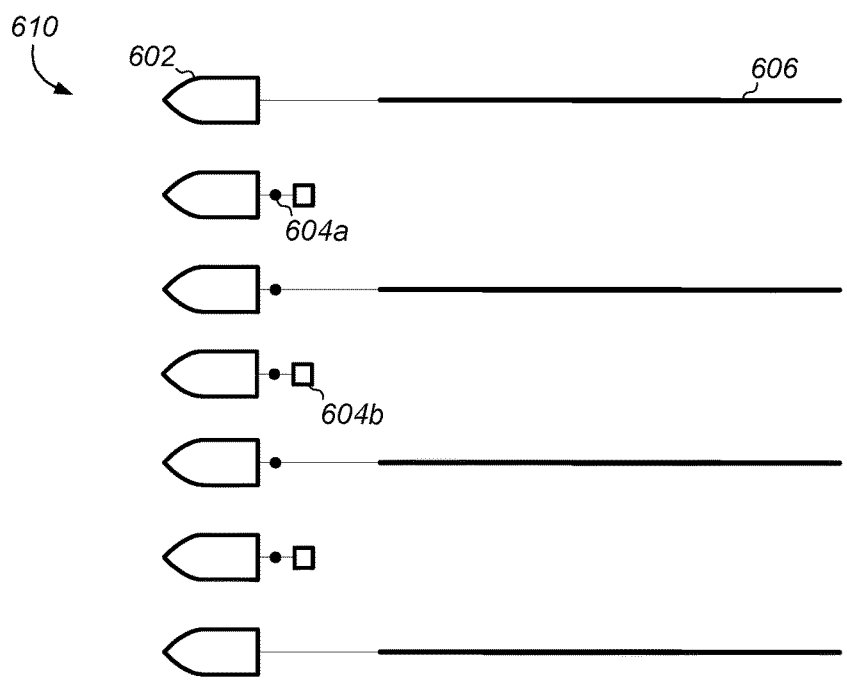

Referring to FIG. 6B, survey configuration 610 is shown in which a plurality of unmanned tow vessels 602 are configured to tow various combinations of signal sources 604 and/or streamers 606. For example, in the depicted embodiment, the two outermost unmanned tow vessels 602 in the survey spread are shown towing only a streamer 606. Further, three unmanned tow vessels 602 are shown towing only signal sources 604 (e.g., high-frequency signal sources 604a and mid-frequency signal sources 604b). Additionally, two unmanned tow vessels 602 are shown towing both signal sources 604 (e.g., high-frequency signal sources 604a) and streamers 606. Note that, in some embodiments, one or more of the unmanned tow vessels 602 may be further configured to tow one or more low-frequency signal source 604c (not shown).

Figure 6C:
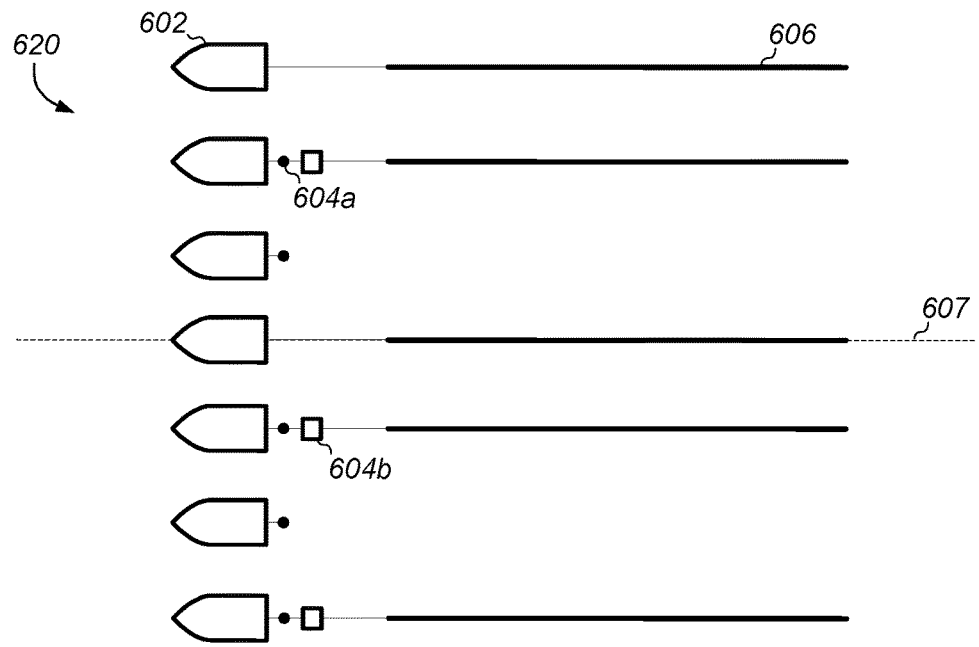

In FIG. 6C, a survey configuration 620 is depicted in which a plurality of unmanned tow vessels 602 are configured to tow signal sources 604 and streamers 606 in an asymmetric configuration, such that the distribution of both the signal sources and the streamers is asymmetric relative to a centerline 607. For example, in survey configuration 620, seven unmanned tow vessels 602 are shown. Of the seven unmanned tow vessels 602, three are positioned to the right (relative to the direction of motion of the unmanned tow vessels 602) of centerline 607, three are positioned to the left of centerline 607, and one is positioned on centerline 607. Further, the seven unmanned tow vessels 602 of survey configuration 620 are configured to tow combinations of signal sources 604 and streamers 606. As opposed to a symmetric survey configuration (such as survey configuration 600 of FIG. 6A), however, the signal sources 604 and streamers 606 towed in survey configuration 620 are asymmetric about centerline 607. That is, the number, type, and distribution of signal sources 604 towed to the right of centerline 607 are distinct from the number, type, and distribution of signal sources 604 towed to the left of centerline 607. Similarly, the distribution of streamers 606 towed on the right of centerline 607 are distinct from the distribution of streamers 606 towed on the left of centerline 607.

In the illustrated embodiment, for example, three signal sources 604 (two high-frequency signal sources 604a and one mid-frequency signal source 604b) are towed to the right of centerline 607 and five signal sources 604 (three high-frequency signal sources 604a and two mid-frequency signal sources 604b) are towed to the left of centerline 607. Further, the distribution of the signal sources 604 to the right of centerline 607 varies from the distribution of the signal sources 604 to the left of centerline 607. Similarly, the distribution of the streamers 606 to the right of centerline 607 does not match the distribution of streamers 606 to the left of centerline 607.

Note that numerous variations on survey configuration 620 are contemplated within the scope of the present disclosure. For example, in some embodiments, survey configuration 620 may be modified such that only a distribution of the signal sources or only a distribution of the streamers is asymmetric relative to centerline 607. Performing a geophysical survey using the asymmetric distribution of signal sources 604 and or streamers 606 may provide various benefits, such as interpolation benefits when analyzing seismic data collected during such geophysical surveys. Using unmanned tow vessels 602 as disclosed herein may permit geophysical surveys to be performed using asymmetric signal source configuration or streamer configuration, either individually or in combination.

Figure 6D:
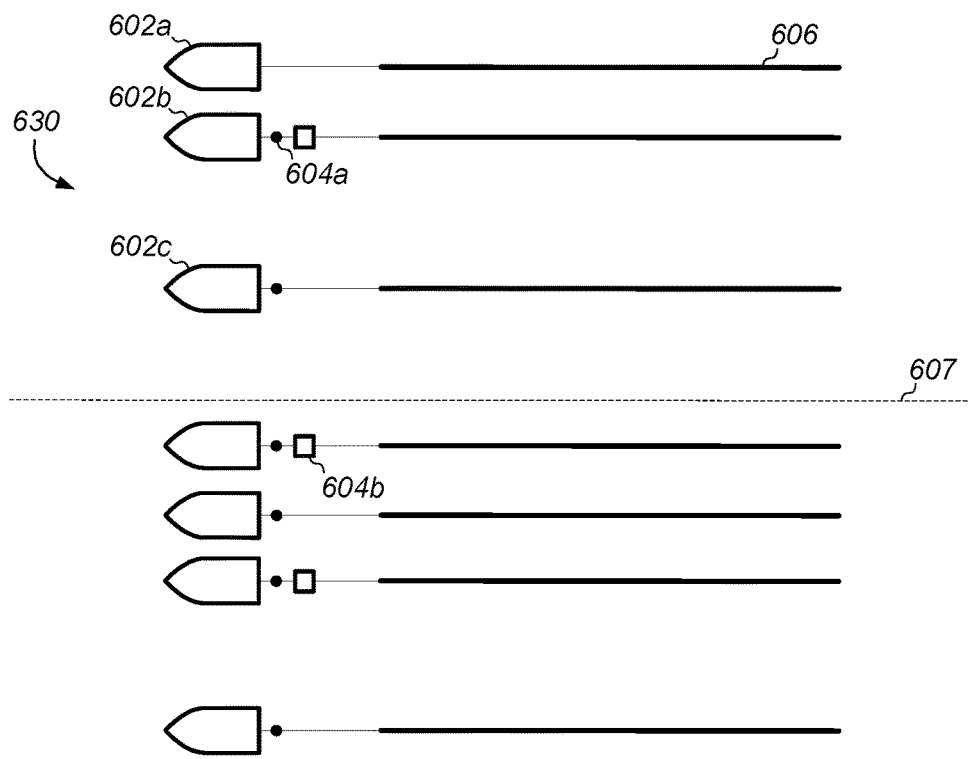

Turning now to FIG. 6D, a survey configuration 630 is depicted in which the lateral distance between unmanned tow vessels 602 is non-uniform. That is, in survey configuration 630, a first lateral spacing between a first and second unmanned tow vessels is greater than a second lateral spacing between a third and fourth unmanned vessels. For example, in the depicted embodiment, survey configuration 630 includes seven unmanned tow vessels 602, each of which is configured to tow one or more signal sources 604 or streamers 606, or both. As shown in FIG. 6D, the lateral distance between the unmanned tow vessels 602 varies, with some of the unmanned tow vessels 602 being positioned relatively close together (such as unmanned tow vessels 602a and 602b), and other of the unmanned tow vessels 602 being positioned relatively far apart (such as unmanned tow vessels 602b and 602c). Survey configuration 630 may provide similar interpolation benefits as survey configuration 620 of FIG. 6C. As opposed to survey configuration 620, however, in which the unmanned tow vessels 602 are in uniform or near-uniform lateral positions relative to each other, survey configuration 630 achieves the interpolation benefits through non-uniform lateral spacing of unmanned tow vessels 602. This non-uniform lateral spacing results a non-uniform distribution of signal sources 604 and/or streamers 606. That is, using the non-uniform lateral spacing depicted in survey configuration 630, the unmanned tow vessels 602 are configured to tow signal sources 604 and streamers 606 such that either the signal source configuration, the streamer configuration, or both is asymmetric relative to a centerline 607.

Figure 6E:
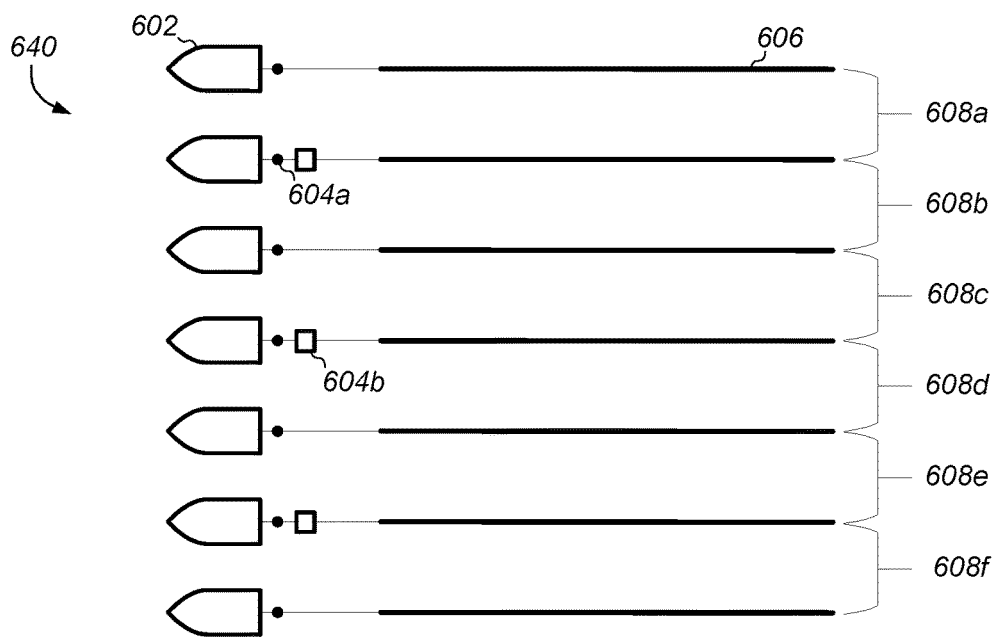

Referring to FIG. 6E, a survey configuration 640 is shown in which the plurality of unmanned tow vessels 602 are configured to adjust a lateral spacing between one or more of the unmanned tow vessels 602 while traversing a sail path during the course of a geophysical survey. In some situations, it may be advantageous to obtain denser data-acquisition in some portions of a survey area relative to other portions of the survey area. In such embodiments, survey configuration 640 may be implemented such that the density of signal sources 604 or streamers 606 is higher in those portions of the survey area for which denser data-acquisition is desired. For example, consider a situation in which denser data acquisition is desired on the right side of the survey spread (relative to the direction of motion of the unmanned tow vessels 602) than on the left side of the survey spread. In such a situation, the lateral distances 608a and 608b between unmanned tow vessels 602a and 602b and unmanned tow vessels 602b and 602c, respectively, may be decreased. This would increase the density of signal sources 604 and streamers 606 in this portion of the survey area, which in turn would result in denser data-acquisition.

Note that, in various embodiments of survey configuration 640, the lateral distances 608a-608f between unmanned tow vessels 602 may not vary by the same amount. That is, the lateral distance 608a between unmanned tow vessels 602a and 602b may change differently (e.g., at different times, by different distances, etc.) than the lateral distance 608b between unmanned tow vessels 602b and 602c. In various embodiments, performing a geophysical survey using unmanned tow vessels as described herein permits the lateral distance between unmanned tow vessels 602 to be changed, as in survey configuration 640, as desired during the course of a survey. This capability may provide added flexibility to the performance of the geophysical surveys and facilitate acquiring denser data-acquisition during such surveys.

Figure 6F:
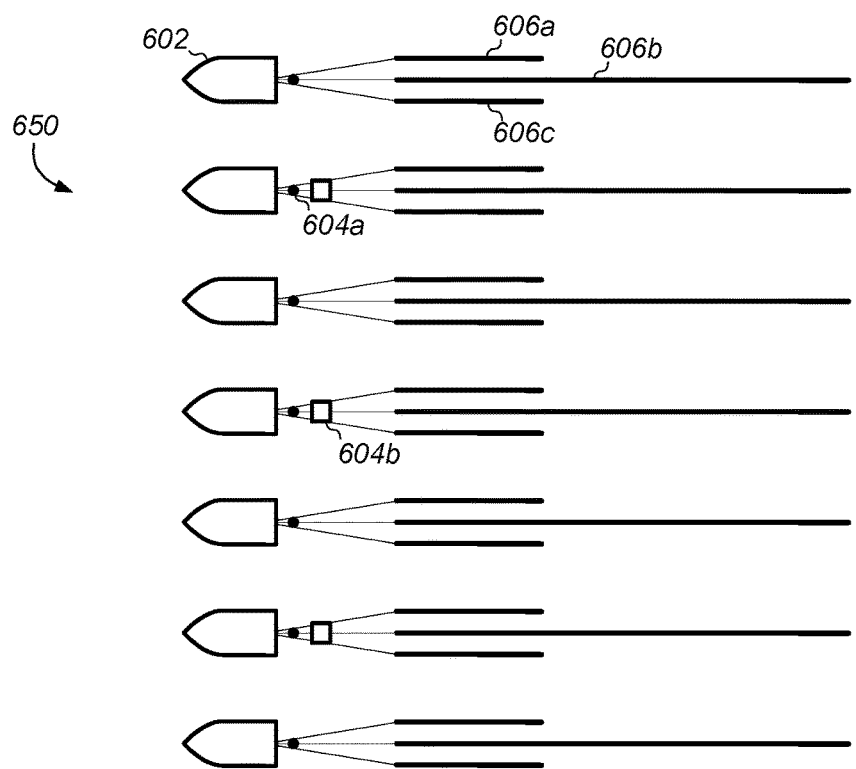
Figure 6L:
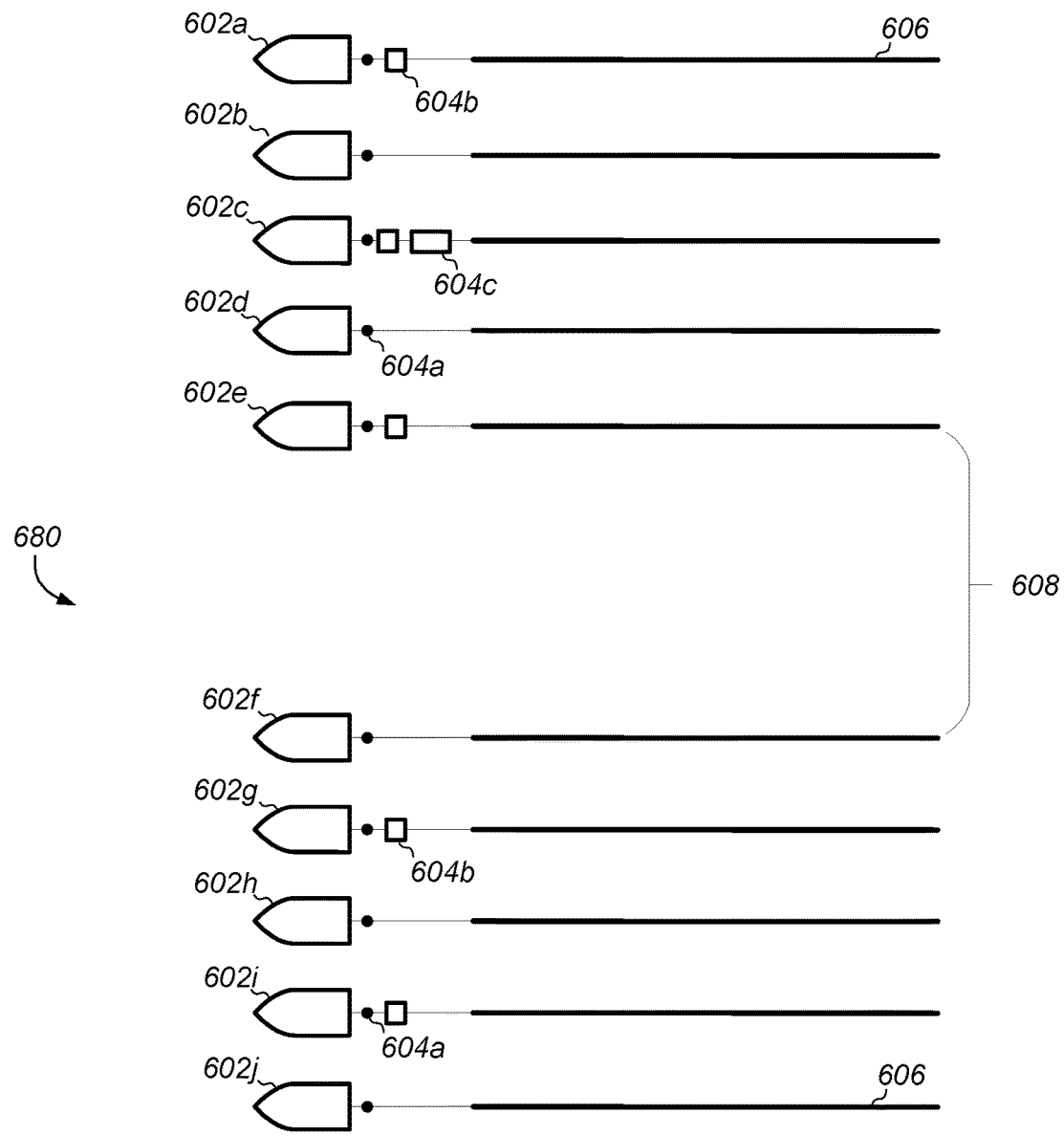

In FIG. 6F, a survey configuration 650 is depicted in which the unmanned tow vessels 602 tow multiple streamers 606. For example, each of the unmanned tow vessels 602 in the illustrated survey configuration 650 is shown towing three streamers 606a-606c. Further, as shown in FIG. 6F, unmanned tow vessels 602 may be configured to tow streamers 606 that vary in length. For example, in the depicted embodiment, each unmanned tow vessel 602 is shown towing one longer streamer 606b (e.g., 12 km) and two shorter streamers 606a and 606c (e.g., 3 km). Survey configuration 650 may present various benefits in performing a geophysical survey. For example, towing both shorter and longer streamers 606 by an unmanned tow vessel 602 may allow for increased high-frequency data to be acquired at the front end of the streamer spread. Additionally, towing multiple streamers 606 as in survey configuration 650 may reduce aliasing in the geophysical survey data collected by the streamers 606.

Note that, although unmanned tow vessels 602 are only shown towing multiple streamers 606 in FIG. 6F, any of the unmanned tow vessels 602 depicted in survey configurations 600-680 may be configured to tow multiple streamers, according to various embodiments.

FIG. 6G depicts a survey configuration 660 having a first plurality of unmanned tow vessels 602a-602d distributed in a crossline direction to form a survey spread. Each of unmanned tow vessels 602a-602d is shown towing a streamer. Further, survey configuration 660 includes a plurality of unmanned tow vessels 602e-602h that is different from the first plurality and distributed in a crossline direction to form a different survey spread configured to tow one or more streamers and one or more source elements. As shown in FIG. 6G, each of the unmanned tow vessels 602e-602h are configured to traverse a sail path at a particular distance in an inline direction behind the first plurality of unmanned tow vessels 602a-602d. As used herein, the term "inline direction" is to be understood according to its ordinary meaning in the art, which includes a direction parallel to a given sail path.

Survey configuration 660 may present various advantages when performing a geophysical survey. For example, in survey configuration 660, the one or more streamers 606 towed by the first subset of unmanned tow vessels 602a-602d may collect seismic data generated by the one or more signal sources 604 towed by the second subset of unmanned tow vessels 602e-602h. Further, the one or more streamers 606 towed by the second subset of unmanned tow vessels 602e-602h may also collect seismic data generated by the one or more signal sources towed by the second subset of unmanned tow vessels 602e-602h. Thus, using survey configuration 660, a survey system may acquire geophysical data at various source-to-receiver distances or "offsets" at the same time, which may be beneficial, for example, in acquiring survey data corresponding to complex subsurface geological structures.

Referring now to FIG. 6H, a survey configuration 670 is shown in which a first subset of unmanned tow vessels 602a-602d are positioned a distance 608 ahead of a second subset of unmanned tow vessels 602e-602h. As shown in FIG. 6H, both the first and second subsets of unmanned tow vessels 602 are configured to tow one or more signal sources 604 and one or more streamers 606. As in FIG. 6G, survey configuration 670 of FIG. 6H may present various advantages when performing a geophysical survey, such as acquiring geophysical data at various offsets simultaneously. Further, in some situations, it may be advantageous to perform a geophysical survey using survey configuration 670 in which the distance 608 of separation between the first and second subsets of unmanned tow vessels is very large, such as a full streamer length (e.g., 8 km), for example. In such embodiments, the streamers 606 towed by the second subset of unmanned tow vessels 602e-602h may collect seismic data generated by both the signal sources 604 towed by the first and second subset of unmanned tow vessels. Further, in various embodiments, the signal sources 604 towed by both the first and subset of unmanned tow vessels 602 may be actuated simultaneously, which may result in denser data-acquisition by streamers 606.

In FIG. 6I, a survey configuration 680 is shown having a first plurality of unmanned tow vessels 602a-602e and a different plurality of unmanned tow vessels 602f-602j. As shown in FIG. 6I, the first plurality of unmanned tow vessels 602a-602e are distributed in a crossline direction to form a first survey spread and the different plurality of unmanned tow vessels 602f-602j are distributed in a crossline direction to form a different survey spread. In the depicted embodiment, both the first plurality of unmanned tow vessels 602a-602e and the different plurality of unmanned tow vessels 602f-602j are configured to tow one or more signal sources 604 and one or more streamers 606. Note, however, that in some embodiments, one or more of the plurality of unmanned tow vessels 602 may be configured to tow only signal sources 604 or only streamers 606. As shown in FIG. 6I, the different plurality of unmanned tow vessels 602f-602j are shown traversing a sail path that is positioned at a particular distance in a crossline direction relative to the survey spread of the first plurality of unmanned tow vessels 602a-602e. In performing a geophysical survey using survey configuration 680, the streamers 606 towed by the first plurality of unmanned tow vessels 602a-602e may collect seismic data generated by the signal sources 604 towed by both the first plurality of unmanned tow vessels 602a-602e and the different plurality of unmanned tow vessels 602f-602j. Similarly, the streamers 606 towed by the different plurality of unmanned tow vessels 602e-602j may collect seismic data generated by the signal sources 604 towed by both the first and different pluralities of unmanned tow vessels 602.

Survey configuration 680, also referred to herein as a "wide-azimuth survey configuration," may be particularly useful when performing geophysical surveys near various surface or subsurface obstructions (e.g., sandbanks, drilling rigs, salt domes, etc.). In such situations, survey configuration 680 facilitates gathering seismic data corresponding to formations beneath the surface or subsurface obstruction by the process of "undershooting," in which a common midpoint (CMP) between the signal sources 604 and the streamers 606 lie under the obstruction. Further, by making successive passes over a geophysical formation with increasing lateral separation distance 608 between the first and second subset of unmanned tow vessels 602, an increased azimuthal range may be accomplished, according to some embodiments.

Note that the survey configurations depicted in FIGS. 6A-6I are provided merely as examples and are not intended to limit the scope of the present disclosure. As one of ordinary skill in the art with the benefit of this disclosure will understand, in some embodiments the survey configurations 600-680 may be combined or modified in any suitable manner. Further, note that, in accordance with embodiments of the present disclosure, the disclosed survey configurations 600-680 may include any suitable number of unmanned tow vessels 602 configured to tow any suitable number of signal sources 604 and/or streamers 606.

Figure 7A:
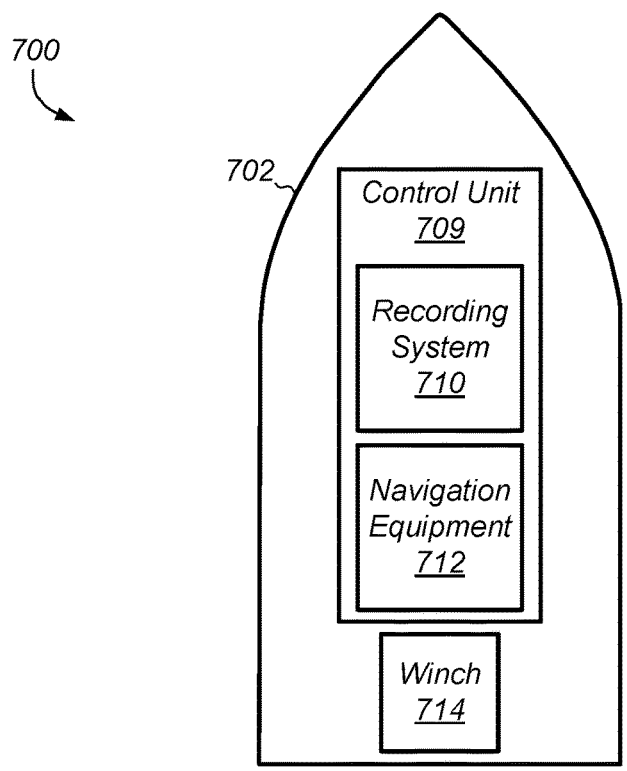
FIGS. 7A-7B show a top and bottom view, respectively, of an example unmanned tow vessel, according to some embodiments.

Turning now to FIG. 7A, a block diagram showing a top view 700 of an example unmanned tow vessel 702 is depicted, according to some embodiments. In the embodiment illustrated in FIG. 7A, unmanned tow vessel 702 includes control unit 709, which includes recording system 710 and navigation equipment 712, and winch 714. In various embodiments, unmanned tow vessel 702 may be implemented as one of unmanned tow vessels 302 of FIG. 3.

As shown in FIG. 7A, unmanned tow vessel 702 includes control unit 709, which in turn includes recording system 710 and navigation equipment 712. As described above with reference to FIG. 3, recording system 710 may include devices such as a data recording unit (not shown separately) for making a record with respect to time of signals collected by one or more streamers. The data collected may be used for various purposes, including the generation of a geophysical data product.

Unmanned tow vessel 702 further includes navigation equipment 712, which, in some embodiments, may correspond to navigation equipment 312 of FIG. 3. In various embodiments, navigation equipment 712 may be configured to receive (e.g., wirelessly) or store information usable to control the position of unmanned tow vessel 702 as it traverses various sail paths. For example, in some embodiments, navigation equipment 712 may be configured to control the position of unmanned tow vessel 702 based on a control signal received wirelessly from one or more support vessels. Further, in some embodiments, navigation equipment 712 may be configured to autonomously control the position of unmanned tow vessel 702, rather than or in addition to controlling the position based on a control signal received from a support vessel. For example, in such embodiments, navigation equipment 712 may be configured to autonomously control the position of unmanned tow vessel 702 as it traverses various sail paths based on route or formation information stored by navigation equipment 712.

Further, unmanned tow vessel 702 includes winch 714. In various embodiments, winch 714 may be configured to control a position of one or more sources or streamers towed by unmanned tow vessel 702. For example, winch 714 may include a motorized reel or pulley over which lines can be spooled. Winch 714 may extend lines between unmanned tow vessel 702 and one or more streamers or one or more signal sources, such as high-, mid-, and/or low-frequency signal sources 404a-404c of FIG. 4. In various embodiments, the lines between unmanned tow vessel 702 and the one or more streamers or one or more signal sources may include communication lines that facilitate the transfer of electrical power or data. The lines may be extended outward from and retracted inward toward the unmanned tow vessel 702 by the winch 714, thus controlling a position of the one or more streamers or the one or more signal sources. As the lines are retracted, the streamers or signal sources may be pulled closer to unmanned tow vessel 702 or closer to the surface of the water. Conversely, as the lines are extended, the streamers or signal sources may be released further from unmanned tow vessel 702 or deeper into the water.

In some embodiments, control unit 709 may be configured to control the operation of winch 714. In other embodiments, however, the operation of winch 714 may be remotely controlled by a communication system of a separate vessel, such as communication system 512 of survey vessel 508 in FIG. 5A, for example. Winch 714 may, in some embodiments, be configured to wirelessly communicate with control unit 709 or a separate vessel. In other embodiments, however, winch 714 may be configured to directly communicate with control unit 709 or another vessel, for example via one or more communication lines.

In some embodiments, control unit 709 (or a remote control unit of a separate vessel) may be configured to control active heave compensation of a plurality of sources towed by unmanned tow vessel 702. As used herein, "active heave compensation" refers to methods or devices used to reduce the influence of waves on offshore geophysical surveys. For example, in some embodiments, it may be desirable to keep a signal source at a particular depth while performing a geophysical survey. The actual depth of the signal source, however, may fluctuate, for example due to the occurrence of waves. In such embodiments, control unit 709 may be configured to implement active heave compensation by controlling the winch 714 to extend or retract the line as necessary to keep the signal source at the particular depth. For example, in some embodiments, control unit 709 may store information corresponding to towing positions for one or more signal sources. Further, winch 714 may include one or more sensors (not shown) configured to detect the position of at least one of the plurality of signal sources, or the length that an associated line is extended. Information from the one or more sensors may be transmitted to the control unit 709, which may extend or retract the associated line to maintain the desired position of the one or more signal sources. Such active heave compensation may be performed automatically, such that no user input is required, according to some embodiments.

In various embodiments, winch 714 may be located onboard unmanned tow vessel 702, as shown in FIG. 7A. In other embodiments, however, winch 714 may also be within or externally-coupled to unmanned tow vessel 702. Note that, while one winch 714 is shown in FIG. 7A, unmanned tow vessel 702 may include any suitable number of onboard, internal, or external winches. Further, note that winch 714 is not limited to reels or pulleys described herein and may include any other devices suitable for extending and retracting lines.

Figure 7B:
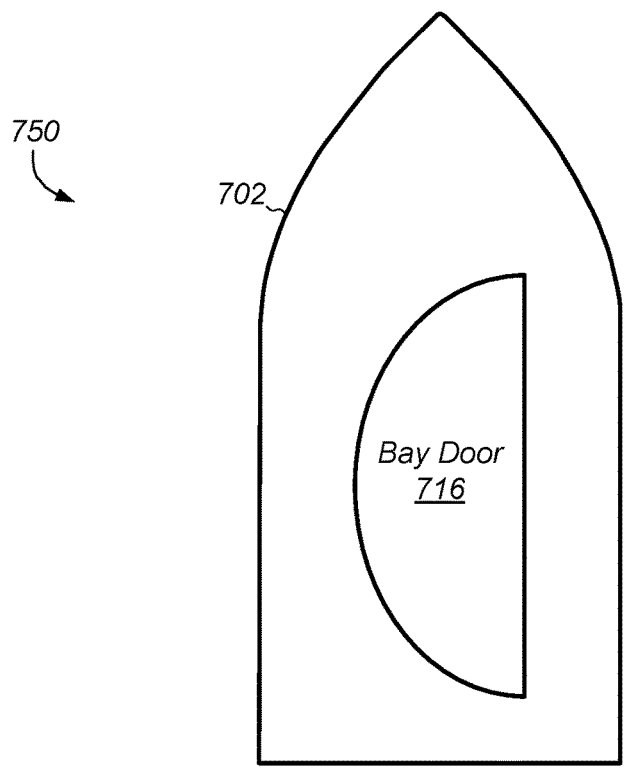

Referring now to FIG. 7B, a block diagram showing a bottom view 750 of an example unmanned tow vessel 702 is depicted, according to some embodiments. As shown in FIG. 7B, unmanned tow vessel 702 includes bay door 716. In various embodiments, bay door 716 may be configured to open and close to accommodate the storage and release of one or more sources in a bay (not shown) of unmanned tow vessel 702. For example, unmanned tow vessel 702 may store one or more of a high-, mid-, or low-frequency signal source in a bay of the unmanned tow vessel 702, protected by bay door 716. The signal sources may be released from the bay by opening bay door 716 and allowing the signal sources to lower into the water. Further, the bay of unmanned tow vessel 702 may be configured to receive one or more signal sources. For example, as noted above, the one or more signal sources may be connected to winch 714 via lines, which may be retracted to pull the one or more signal sources towards unmanned tow vessel 702. In various embodiments, as winch 714 pulls the one or more signal sources towards the bay, the bay door 716 may be opened, permitting the one or more signal sources to be received by and stored in the bay of unmanned tow vessel 702. Opening and closing of bay door 716 may be controlled by control unit 709 or a remote control unit of a separate vessel, in some embodiments.

Note that, in various embodiments, unmanned tow vessel 702 may include any other additional elements suitable for use in a geophysical survey, such as power sources, navigational lights, compressors, etc. Such additional elements are omitted from FIGS. 7A-7B for clarity.

Figure 8:
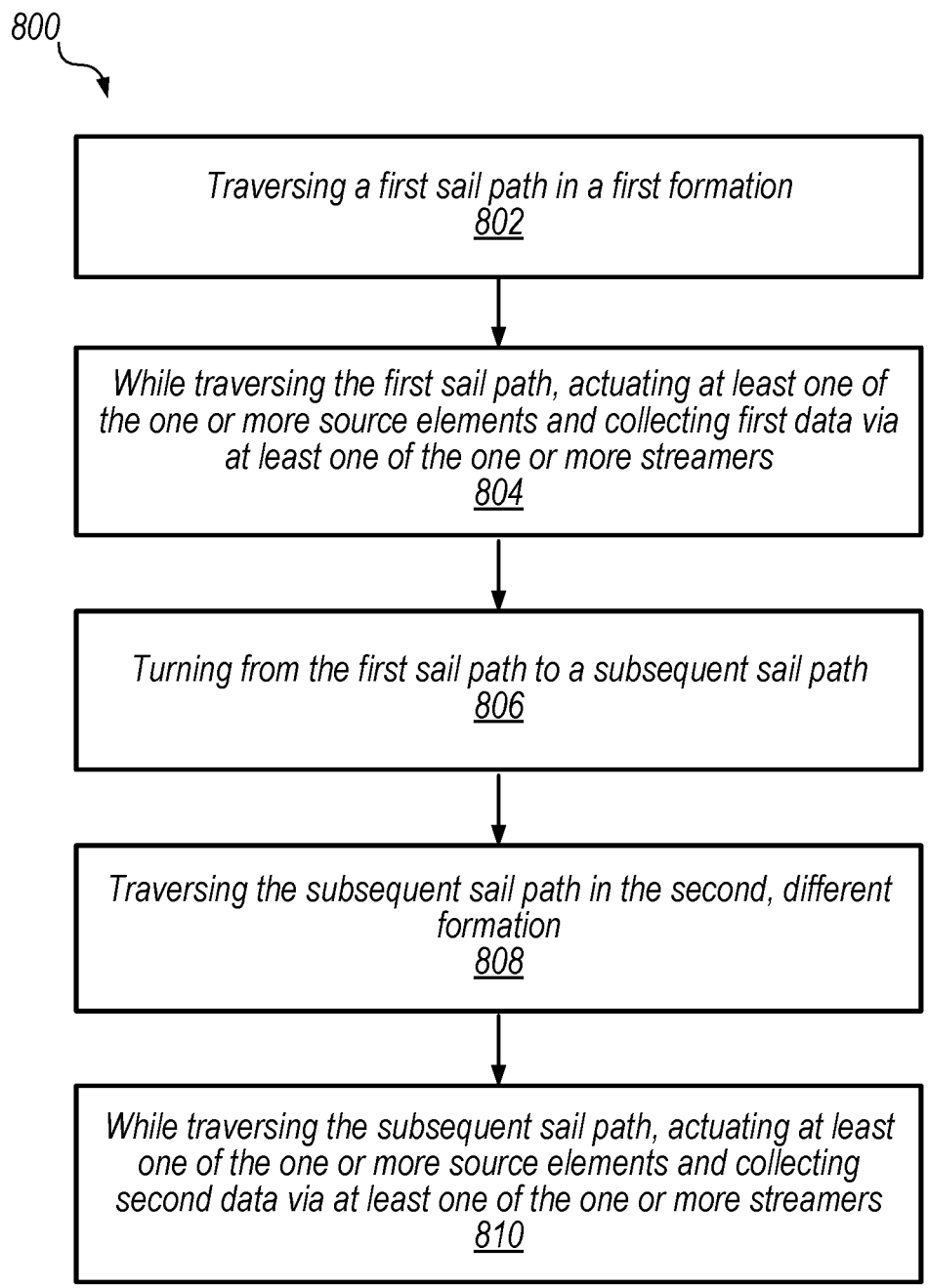
FIG. 8 shows a flow diagram of an example method for performing a geophysical survey using a plurality of unmanned tow vessels, according to some embodiments.

Turning now to FIG. 8, a flow diagram is shown of an example method 800 for performing a marine geophysical survey using a plurality of unmanned tow vessels, according to some embodiments. In various embodiments, method 800 may be implemented, for example, by the plurality of unmanned tow vessels 302 of FIG. 3. FIG. 8 includes steps 802-810.

At step 802, a plurality of unmanned tow vessels traverse a first sail path in a first formation. In some embodiments, the plurality of unmanned tow vessels may include a first unmanned tow vessel that is configured to tow one or more source elements and a second unmanned tow vessel that is configured to tow one or more streamers. In other embodiments, however, one or more of the plurality of unmanned tow vessels, and in some embodiments each of the plurality of unmanned tow vessels, may be configured to tow one or more source elements and one or more streamers. The first formation may include a first ordering of the plurality of unmanned tow vessels. Further, in some embodiments, the first formation may include the plurality of unmanned tow vessels arranged in the first ordering in a crossline direction relative to the first sail path. One of ordinary skill in the art with the benefit of this disclosure will understand that the survey spread may not be precisely perpendicular to the sail path. Rather, when discussing an ordering of vessels in the perpendicular direction, this disclosure refers to the ordering that the vessels would have if their positions were projected onto such a perpendicular axis within the plane of the surface of the water. For example, the first ordering of unmanned tow vessels 302a-302d of FIG. 3 may be, from left to right relative to the direction of motion of the unmanned tow vessels: 302a, 302b, 302c, and 302d.

Method 800 then proceeds to step 804, which includes actuating at least one of the one or more source elements and collecting first data via at least one of the one or more streamers while the plurality of unmanned tow vessels are traversing the first sail path. In some embodiments, one or more of the unmanned tow vessels may be configured to be remotely controlled, for example by survey vessel 508 in FIG. 5, to actuate the one or more source elements, for example signal sources 504, and collect first data via streamers 506 while traversing the first sail path.

Method 800 then proceeds to step 806, which includes the plurality of unmanned tow vessels turning from the first sail path toward a subsequent sail path. For example, as depicted in FIG. 3, the plurality of unmanned tow vessels 302 may be configured to turn from first sail path 316, along turning routes 314, to subsequent sail path 318. In some embodiments, the plurality of unmanned tow vessels may be configured to actuate the one or more source elements and collect third data via the one or more streamers while turning toward the subsequent sail path. In other embodiments, however, the plurality of unmanned tow vessels may be configured to turn toward the subsequent sail path without actuating the one or more source elements.

Method 800 then proceeds to step 808, which includes the plurality of unmanned tow vessels traversing the subsequent sail path in a second, different formation. The second formation may include a second, different ordering of the plurality of unmanned tow vessels. Further, in some embodiments, the second formation may include the plurality of unmanned tow vessels arranged in the second, different ordering in a crossline direction relative to the subsequent sail path. For example, the second ordering of unmanned tow vessels 302a-302d of FIG. 3 may be, from left to right relative to the direction of motion of the unmanned tow vessels: 302d, 302c, 302b, and 302a.

Method 800 then proceeds to step 810, which includes actuating at least one of the one or more source elements and collecting second data via at least one of the one or more streamers while the plurality of unmanned tow vessels are traversing the subsequent sail path. In some embodiments, unmanned tow vessels may be configured to be remotely controlled, for example by survey vessel 508 in FIG. 5, to actuate the one or more source elements, for example signal sources 504, and collect first data via streamers 506 while traversing the subsequent sail path.

The first and second data collected via the one or more streamers may be used, for example, to generate geophysical survey data. For example, geophysical survey data can be generated based on the first and second data, where the geophysical survey data corresponds to formations disposed below the bottom of body of water 101 along or near the first and/or subsequent sail paths. In one embodiment, the geophysical survey data generated based on the first and second data can be stored on a geophysical data product, which may be imported into various countries, such as the United States. The first and second data collected via the one or more streamers may also be wirelessly transmitted by one or more of the unmanned tow vessels to a separate survey vessel, for example survey vessel 508 in FIG. 5. The collected first and second data may be transmitted, for example, using recording system 310 of FIG. 3. In another embodiment, each of the unmanned tow vessels may be operable to store the raw data that it collects via the one or more streamers while traversing the first and subsequent sail path.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 9:
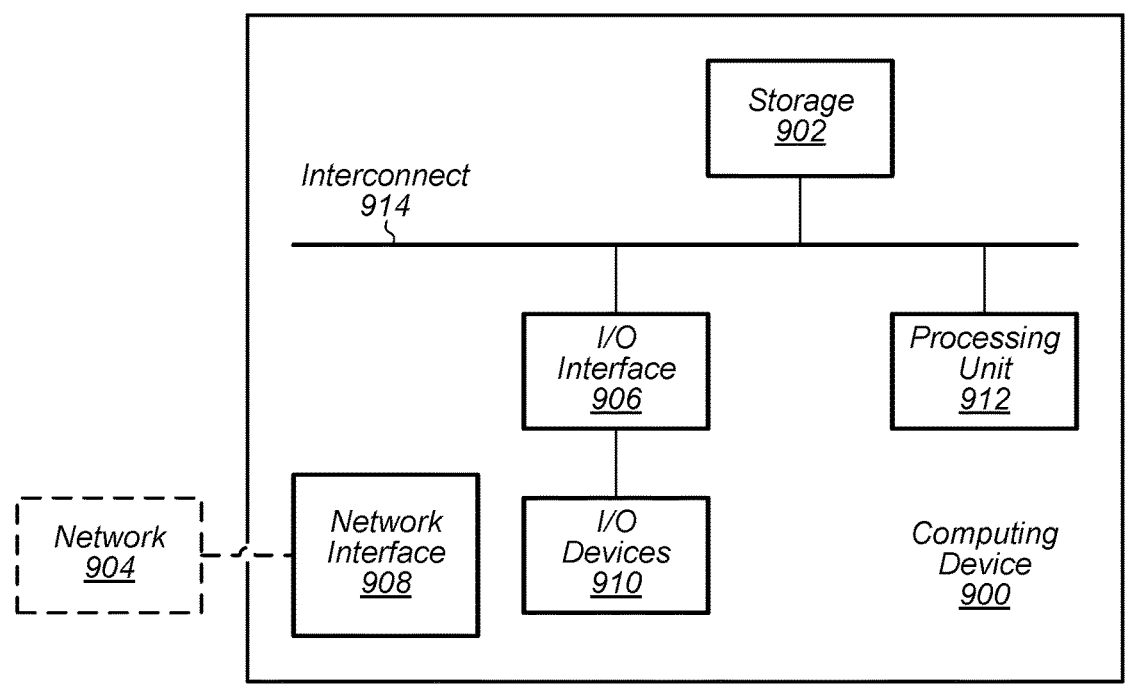
FIG. 9 shows a block diagram illustrating an example computing system, according to some embodiments.

Turning now to FIG. 9, a block diagram of a computing device (which may also be referred to as a computing system) 900 is depicted, according to some embodiments. Computing device 900 may be used to implement various portions of this disclosure. Computing device 900 is one example of a device that may be used, for example, as part of recording system 710 or navigation equipment 712 of FIG. 7A, or any other computing system implementing portions of this disclosure.

Computing device 900 may be any suitable type of device, including, but not limited to, a personal computer system, desktop computer, laptop or notebook computer, mobile phone, mainframe computer system, web server, workstation, or network computer. As shown, computing device 900 includes processing unit 912, storage subsystem 902, input/output (I/O) interface 906 coupled via interconnect 914 (e.g., a system bus). I/O interface 906 may be coupled to one or more I/O devices 910. Computing device 900 further includes network interface 908, which may be coupled to network 904 for communications with, for example, other computing devices.

As described above, processing unit 912 includes one or more processors. In some embodiments, processing unit 912 includes one or more coprocessor units. In some embodiments, multiple instances of processing unit 912 may be coupled to interconnect 914. Processing unit 912 (or each processor within processing unit 912) may contain a cache or other form of on-board memory. In some embodiments, processing unit 912 may be implemented as a general-purpose processing unit, and in other embodiments it may be implemented as a special purpose processing unit (e.g., an ASIC). In general, computing device 900 is not limited to any particular type of processing unit or processor subsystem.

As used herein, the terms "processor," "processing unit," or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 902 is usable by processing unit 912 (e.g., to store instructions executable by and data used by processing unit 912). Storage subsystem 902 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 902 may consist solely of volatile memory in some embodiments. Storage subsystem 902 may store program instructions executable by computing device 900 using processing unit 912, including program instructions executable to cause computing device 900 to implement the various techniques disclosed herein.

I/O interface 906 may represent one or more interfaces and may be any of various types of interfaces configured to couple to and communicate with other devices, according to various embodiments. In some embodiments, I/O interface 906 is a bridge chip from a front-side to one or more back-side buses. I/O interface 906 may be coupled to one or more I/O devices 910 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "communication system configured to remotely control a plurality of unmanned tow vessels" is intended to cover, for example, a mechanism that performs this function during operation, even if the mechanism in question is not currently being used (e.g., a power supply is not connected to it, or no unmanned tow vessels are currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for [performing a function]" construct.

As used herein, the terms "first," "second," etc. are used as labels for nouns that they precede, and do not imply any type of ordering (e.g., spatial, temporal, logical, etc.) unless specifically stated. For example, a reference to a "first" sail path and a "second" sail path may refer to any two sail paths in a geophysical survey. In short, references such as "first," "second," etc. are used as labels for ease of reference in the description and in the appended claims.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a plurality of unmanned tow vessels, including:
      a first unmanned tow vessel that is configured to tow one or more vibratory source elements but not any streamers; and
      a second unmanned tow vessel that is configured to tow one or more vibratory source elements and one or more streamers;
   wherein the plurality of unmanned tow vessels are configured to:

traverse a first sail path in a first formation, wherein the first formation includes a first ordering of the plurality of unmanned tow vessels;

while traversing the first sail path in the first formation, actuate at least one vibratory source element within the system and collect first data via at least one streamer within the system;

turn toward a subsequent sail path, wherein both the first and second unmanned tow vessels turn toward the subsequent sail path using substantially similar turning radii;

traverse the subsequent sail path in a second formation, wherein the second formation includes a second, different ordering of the plurality of unmanned tow vessels; and while traversing the subsequent sail path in the second formation, actuate at least one vibratory source element within the system and collect second data via at least one streamer within the system.

2. The system of claim 1, wherein the plurality of unmanned tow vessels are further configured to:

while turning toward the subsequent sail path, actuate at least one vibratory source element within the system and collect third data via the one or more streamers.

3. The system of claim 1, wherein the plurality of unmanned tow vessels are further configured to turn toward the subsequent sail path without actuating at least one vibratory source element within the system.

4. The system of claim 1, wherein the first formation further includes the plurality of unmanned tow vessels arranged in the first ordering in a crossline direction relative to the first sail path, and wherein the second formation further includes the plurality of unmanned tow vessels arranged in the second, different ordering in a crossline direction relative to the subsequent sail path.

5. The system of claim 1, wherein the second, different ordering is a mirror image of the first formation.

6. The system of claim 1, further comprising:

a survey vessel including a communication system, wherein the communication system is configured to remotely control the plurality of unmanned tow vessels to turn toward the subsequent sail path.

7. The system of claim 1, wherein the plurality of unmanned tow vessels are configured to turn toward the subsequent sail path autonomously.

8. The system of claim 1, wherein a first subset of the plurality of unmanned tow vessels is configured to tow one or more high-frequency vibratory source elements, wherein a second subset of the plurality of unmanned tow vessels is configured to tow one or more mid-frequency vibratory source elements, and wherein a third subset of the plurality of unmanned tow vessels is configured to tow one or more low-frequency vibratory source elements.

9. The system of claim 8, wherein at least one unmanned tow vessel is an element of both the first subset and the second subset.

10. The system of claim 8, wherein at least one unmanned tow vessel is an element of the first subset, the second subset, and the third subset.

11. The system of claim 1, wherein the plurality of unmanned tow vessels further includes:

a third unmanned tow vessel that is configured to tow at least one streamer but not any vibratory source elements.

12. A method, comprising:

a plurality of unmanned tow vessels traversing a first sail path in a first formation, wherein the first formation includes a first ordering of the plurality of unmanned tow vessels in a direction perpendicular to the first sail path, and wherein the plurality of unmanned tow vessels includes:

a first unmanned tow vessel that is configured to tow one or more vibratory source elements but not any streamers; and a second unmanned tow vessel that is configured to tow one or more vibratory source elements and one or more streamers;

while traversing the first sail path, actuating at least one vibratory source element and collecting first data via at least one streamer;

the plurality of unmanned tow vessels turning from the first sail path to a subsequent sail path, wherein both the first and second unmanned tow vessels turn toward the subsequent sail path using substantially similar turning radii;

traversing, by the plurality of unmanned tow vessels, the subsequent sail path in a second, different formation, wherein the second, different formation includes a second, different ordering of the plurality of unmanned tow vessels in a direction perpendicular to the subsequent sail path; and while traversing the subsequent sail path, actuating at least one vibratory source element and collecting second data via at least one streamer.

13. The method of claim 12, wherein the subsequent sail path is a second sail path immediately after the first sail path.

14. The method of claim 12, wherein the first sail path and the subsequent sail path include a first route and a second route, respectively, in a substantially straight direction along a surface of a body of water.

15. The method of claim 12, wherein the plurality of unmanned tow vessels are remotely controlled.

16. The method of claim 12, further comprising:

generating geophysical survey data based on the first data and the second data.

17. The method of claim 16, further comprising:

storing the geophysical survey data on a geophysical data product.

18. The method of claim 17, further comprising:

importing the geophysical data product into the United States.

19. The method of claim 12, wherein the plurality of unmanned tow vessels further includes:

a third unmanned tow vessel that is configured to tow at least one streamer but not any vibratory source elements.

* * * * *